United States Patent
Gelberg et al.

(10) Patent No.: US 12,055,385 B1
(45) Date of Patent: Aug. 6, 2024

(54) METHODS AND SYSTEMS FOR VALIDATING PARALLELISM BETWEEN INTERNAL FACETS

(71) Applicant: LUMUS LTD., Nes Ziona (IL)

(72) Inventors: Jonathan Gelberg, Modiin (IL); Elad Sharlin, Mishmar David (IL); Eitan Ronen, Rechovot (IL)

(73) Assignee: LUMUS LTD., Nes Ziona (IL)

( * ) Notice: Subject to any disclaimer, the term of this patent is extended or adjusted under 35 U.S.C. 154(b) by 0 days.

(21) Appl. No.: 18/579,590

(22) PCT Filed: Jul. 26, 2022

(86) PCT No.: PCT/IL2022/050806
§ 371 (c)(1),
(2) Date: Jan. 16, 2024

(87) PCT Pub. No.: WO2023/007490
PCT Pub. Date: Feb. 2, 2023

Related U.S. Application Data

(60) Provisional application No. 63/225,584, filed on Jul. 26, 2021.

(51) Int. Cl.
*G01B 11/26* (2006.01)
*G01B 11/27* (2006.01)
(Continued)

(52) U.S. Cl.
CPC ............ *G01B 11/26* (2013.01); *G01B 11/272* (2013.01); *G01M 11/0242* (2013.01); *G01M 11/35* (2013.01)

(58) Field of Classification Search
CPC ....... G01B 11/26; G01B 11/27; G01B 11/272; G01B 11/30; G01B 11/303; G01B 11/306;
(Continued)

(56) References Cited

U.S. PATENT DOCUMENTS 3,034,397 A * 5/1962 Saunders .................. G01B 9/02
356/510
5,461,472 A * 10/1995 Harvey .................. G01B 11/26
356/138

(Continued)

FOREIGN PATENT DOCUMENTS

CN 102506762 A 6/2012
CN 105424322 A * 3/2016 ............ G01M 11/02
(Continued)

OTHER PUBLICATIONS

PCT International Search Report for International Application No. PCT/IL2022/050806, mailed Nov. 3, 2022, 4pp.
(Continued)

*Primary Examiner* — Gordon J Stock, Jr.
(74) *Attorney, Agent, or Firm* — The Roy Gross Law Firm, LLC; Roy D. Gross

(57) ABSTRACT

Disclosed herein is a method including: (i) providing a light transmissive sample including nominally parallel internal facets, which are about perpendicular to an external surface of the sample; (ii) providing an optical element having a refractive index about equal to that of the sample and including an external first surface and an external second surface acutely inclined relative thereto; (iii) positioning the second surface of the optical element adjacent to the first surface of the sample; (iv) impinging light beams on the first surface of the optical element, about normally thereto; (v) sensing light beams, which exit out of the sample following passage of the impinging light beams via the optical element, transmission thereof into the sample, reflection once off the internal facets, and exit out of the sample; and (vi) based on the sensed data, computing a deviation from parallelism between the internal facets.

27 Claims, 14 Drawing Sheets

(51) Int. Cl.
*G01M 11/00* (2006.01)
*G01M 11/02* (2006.01)

(58) Field of Classification Search
CPC .. G01M 11/00; G01M 11/02; G01M 11/0207;
G01M 11/0214; G01M 11/0242; G01M
11/025; G01M 11/0271; G01M 11/0278;
G01M 11/08; G01M 11/081; G01M
11/30; G01M 11/35; G01M 11/37
See application file for complete search history.

(56) References Cited

U.S. PATENT DOCUMENTS

| | | | |
|---|---|---|---|
| 6,580,529 B1 | 6/2003 | Amitai et al. | |
| 6,671,100 B1 | 12/2003 | McRuer | |
| 7,420,691 B2 * | 9/2008 | Fukui | G11B 7/00375 |
| | | | 356/630 |
| 8,432,614 B2 | 4/2013 | Amitai | |
| 8,548,290 B2 | 10/2013 | Travers et al. | |
| 8,913,865 B1 | 12/2014 | Bennett | |
| 9,494,485 B2 * | 11/2016 | Richards | G01B 11/27 |
| 9,791,703 B1 | 10/2017 | Vallius et al. | |
| 10,133,070 B2 | 11/2018 | Danziger | |
| 10,962,787 B1 | 3/2021 | Lou et al. | |
| 11,226,261 B2 * | 1/2022 | Lobachinsky | G02B 27/0172 |
| 11,262,587 B2 * | 3/2022 | Rubin | G02B 6/00 |
| 11,454,590 B2 * | 9/2022 | Gelberg | G01M 11/35 |
| 11,667,004 B2 | 6/2023 | Maziel et al. | |
| 11,747,137 B2 * | 9/2023 | Eisenberg | G01M 11/0242 |
| | | | 356/138 |
| 11,971,249 B1 * | 4/2024 | Wu | G01B 11/272 |
| 11,971,555 B1 * | 4/2024 | Wu | G02B 23/00 |
| 2007/0091445 A1 | 4/2007 | Amitai | |
| 2009/0003406 A1 | 1/2009 | Sjogren et al. | |
| 2009/0034069 A1 | 2/2009 | Hsu | |
| 2015/0338308 A1 | 11/2015 | Li et al. | |
| 2015/0338655 A1 | 11/2015 | Sawada et al. | |
| 2017/0045743 A1 | 2/2017 | Dobschal et al. | |
| 2017/0199384 A1 | 7/2017 | Yeoh et al. | |
| 2017/0363794 A1 | 12/2017 | Wan et al. | |
| 2017/0363799 A1 | 12/2017 | Ofir et al. | |
| 2017/0371160 A1 | 12/2017 | Schultz | |
| 2018/0059019 A1 | 1/2018 | Chouaib et al. | |
| 2018/0210202 A1 | 7/2018 | Danziger | |
| 2018/0246335 A1 | 8/2018 | Ushakov | |
| 2018/0284448 A1 | 10/2018 | Matsuki et al. | |
| 2019/0293838 A1 | 9/2019 | Haba et al. | |
| 2020/0148574 A1 | 5/2020 | Schillings et al. | |
| 2020/0292733 A1 | 9/2020 | Lee et al. | |
| 2021/0033774 A1 | 2/2021 | Tanaka | |

FOREIGN PATENT DOCUMENTS

| | | | | |
|---|---|---|---|---|
| CN | 113884028 A | * | 1/2022 | |
| JP | 2015121647 A | | 7/2015 | |
| WO | 2018200913 A1 | | 11/2018 | |
| WO | 2020148574 A1 | | 7/2020 | |
| WO | WO-2023007491 A1 | * | 2/2023 | G01B 11/272 |

OTHER PUBLICATIONS

PCT Written Opinion for International Application No. PCT/IL2022/050806, mailed Nov. 3, 2022, 6pp.

* cited by examiner

```
┌─────────────────────────────────────────────────────────────────────┐
│ Providing a sample to be inspected. The sample includes a substrate │
│ having a refractive index $n_s''$ and nominally parallel internal   │
│ facets. Each of the internal facets is about perpendicularly        │
│ oriented relative to an external flat first surface and second      │
│ surface of the sample.                                              │
└─────────────────────────────────────────────────────────────────────┘
                                  │
                                  ▼                          ─1010
┌─────────────────────────────────────────────────────────────────────┐
│ Providing a first optical element (FOE) and a second optical        │
│ element (SOE), each having a respective refractive index about      │
│ equal to $n_s''$. The FOE includes an external and flat first       │
│ surface and second surface opposite and inclined relative thereto   │
│ at an acute inclination angle. The SOE includes an external and     │
│ flat first surface and second surface opposite and inclined         │
│ relative thereto at about the inclination angle.                    │
└─────────────────────────────────────────────────────────────────────┘
                                  │
                                  ▼                          ─1020
┌─────────────────────────────────────────────────────────────────────┐
│ Positioning the sample, the FOE, and the SOE such that the second   │
│ surface of the FOE and the second surface of the SOE are adjacent   │
│ to the first surface and the second surface of the sample,          │
│ respectively.                                                       │
└─────────────────────────────────────────────────────────────────────┘
                                  │
                                  ▼                          ─1030
┌─────────────────────────────────────────────────────────────────────┐
│ Projecting a plurality of incident light beams on the first surface │
│ of the optical element, about normally thereto.                     │
└─────────────────────────────────────────────────────────────────────┘
                                  │
                                  ▼                          ─1040
┌─────────────────────────────────────────────────────────────────────┐
│ Obtaining a plurality of exiting light beams by passage of each     │
│ incident light beam via the FOE, transmission thereof into the      │
│ sample, reflection once off the internal facets, and passage via    │
│ the SOE.                                                            │
└─────────────────────────────────────────────────────────────────────┘
                                  │
                                  ▼                          ─1050
┌─────────────────────────────────────────────────────────────────────┐
│ Sensing (i.e. measuring) the exiting light beams.                   │
└─────────────────────────────────────────────────────────────────────┘
                                  │
                                  ▼                          ─1060
┌─────────────────────────────────────────────────────────────────────┐
│ Computing at least one deviation from parallelism between at least  │
│ some of the internal facets, based on the sensed data.              │
└─────────────────────────────────────────────────────────────────────┘
                                                             ─1070
```

1000    Fig. 10

METHODS AND SYSTEMS FOR VALIDATING PARALLELISM BETWEEN INTERNAL FACETS

CROSS REFERENCE TO RELATED APPLICATIONS

This application is a National Phase of PCT Patent Application No. PCT/IL2022/050806 having International filing date of Jul. 26, 2022, which claims the benefit of priority of U.S. Provisional Patent Application No. 63/225,584, filed Jul. 26, 2021, the contents of which are all incorporated herein by reference in their entirety.

TECHNICAL FIELD

The present disclosure relates generally to methods and systems for metrology of samples including internal facets.

BACKGROUND

Some optical waveguides include reflective, internal facets, which are nominally parallel. In order to validate to high precision the parallelism of such internal facets, current state-of-the-art techniques require high-end optical components. There exists an unmet need in the art for simple and easily implementable metrology techniques, which avoid the use of high-end optical components, thereby addressing mass production demands.

SUMMARY

Aspects of the disclosure, according to some embodiments thereof, relate to methods and systems for metrology of samples including internal facets. More specifically, but not exclusively, aspects of the disclosure, according to some embodiments thereof, relate to optical-based methods and systems for metrology of samples including a plurality of nominally parallel internal facets. Still more specifically, aspects of the disclosure, according to some embodiments thereof, relate to optical-based methods and systems for metrology of reflective waveguides including a plurality of nominally parallel internal facets, which are nominally perpendicular to the major surfaces of the waveguides.

Reflective waveguides are employed in various displays such as head-mounted displays, head-up displays, smartphones, compact displays, 3D displays (stereo displays), as well as compact beam expanders. A reflective waveguide includes a plurality of nominally parallel internal facets across an output section of the waveguide. Light propagating (by total internal reflection) in direction of the output section from a coupling-in section of the waveguide is gradually coupled out of the waveguide through partial reflection and transmission at each of the internal facets. High parallelism between the internal facets, particularly adjacent internal facets, helps to ensure that sharp and clear images (which are not doubled or blurred) are formed on the display.

A number of methods for monitoring parallelism of internal facets in a stack of plates, prior to the dicing of the reflective waveguides into individual units, are known in the art. However, from these early stages of production until the finished product (i.e. until production of the reflective waveguide is completed), changes in the parallelism of the internal facets may well occur.

There exists an unmet need in the art for improved methods of validating parallelism of internal facets in (finished) reflective waveguides, as well as in late stages of production thereof. Advantageously, the present application discloses fast, simple, and precise methods for validating parallelism between internal facets of a reflective waveguide. The present application further discloses systems capable of implementing the disclosed methods, which advantageously avoid the use of high-end and/or complex components.

Thus, according to an aspect of some embodiments, there is provided an optical-based method for validating parallelism between internal facets of a sample. The method includes stages of:

Providing a sample including a light transmissive substrate, which has a refractive index $n_s$, and two or more internal facets. The internal facets are embedded in the substrate and are nominally parallel and about perpendicular to an external and flat first surface of the sample.

Providing a first optical element (FOE) having a refractive index about equal to $n_s$. The FOE includes an external and flat first surface and an external and flat second surface. The second surface of the FOE is opposite to the first surface of the FOE and inclined relative thereto at an acute first inclination angle.

Positioning the sample and the FOE, such that the second surface of the FOE is adjacent to the first surface of the sample.

Projecting a first plurality of light beams on the first surface of the FOE, about normally (i.e. about perpendicularly) thereto.

Obtaining a second plurality of light beams, which exit out of the sample following passage of each of the light beams in the first plurality via (i.e. through) the FOE, transmission thereof into the sample, and reflection once off the internal facets.

Sensing (i.e. measuring) the second plurality of light beams.

Based on the sensed data (obtained in the sensing of the second plurality of light beams), computing at least one deviation from parallelism between at least some the internal facets.

According to some embodiments of the method, the FOE has a refractive index equal to $n_s$.

According to some embodiments of the method, the first plurality of light beams is projected normally to the first surface of the FOE.

According to some embodiments of the method, the stage of computing the deviation from parallelism includes computing angular deviations between light beams (i.e. angles subtended between) in the second plurality.

According to some embodiments of the method, the light beams in the first plurality constitute complementary portions of an expanded light beam, which is collimated.

According to some embodiments of the method, the expanded light beam is monochromatic.

According to some embodiments of the method, the expanded light beam is an expanded laser beam.

According to some embodiments of the method, the FOE is a prism. According to some such embodiments, the FOE is a triangular prism.

According to some embodiments of the method, the sample is shaped as a thin slab or an elongated box.

According to some embodiments of the method, the sample is a one-dimensional reflective waveguide or a two-dimensional reflective waveguide.

According to some embodiments of the method, in the stage of sensing the second plurality of light beams, the light beams in the second plurality are sensed using an image sensor. The sensed data, thereby obtained, includes measured intensities of pixels making up spots on the image sensor. Each of the spots is induced by a respective light beam in the second plurality.

According to some embodiments of the method, the stage of sensing the second plurality of light beams includes viewing light beams in the second plurality through an eyepiece. The light beams in the second plurality being manifested as spots against a graduated reticle of the eyepiece.

According to some embodiments of the method, the stage of computing the deviation from parallelism comprises computing $\varepsilon_{avg}$ and/or $\varepsilon_{max}$. $\varepsilon_{avg}$ is equal to $$\frac{1}{M}\sum_{i,j}, j > i \varepsilon_{ij}. \varepsilon_{max}$$

is =equal to $\max\{\varepsilon_{ij}\}_{i,j>i}$ or $$\sqrt{(\max\{x_i\}_i - \min\{x_i\}_i)^2 + (\max\{y_i\}_i - \min\{y_i\}_i)^2}/(2n_s \cdot f). \ \varepsilon_{ij} =$$

$$\sqrt{(x_i - x_j)^2 + (y_i - y_j)^2}/(2n_s \cdot f). \ \{(x_k, y_k)\}_{k=1}^N$$

is a set of two-dimensional vectors specifying locations of an i-th and j-th spot on the image sensor (formed by the light beams in the second plurality), or against the graduated reticle of the eyepiece. N is the number of the internal facets. M is the number of distinct internal facet pairs (i.e. M=N·(N−1)/2). f is a focal length of a focusing lens or a focusing lens assembly configured to focus the returned light beams on the image sensor or onto the eyepiece.

According to some embodiments of the method, each of the light beams in the first plurality goes on to be reflected off a respective internal facet in the sample.

According to some embodiments of the method, the light beams in the first plurality are projected consecutively, such that the internal facets are inspected one at a time.

According to some embodiments of the method, the consecutive projection is implemented using a translatable slitted or apertured optical mask or a plurality of shutters.

According to some embodiments of the method, in the computing of the deviation from parallelism, deviations from parallelism between pairs of internal facets, from the two or more internal facets, are computed.

According to some embodiments of the method, the pairs of internal facets include pairs of adjacent internal facets.

According to some embodiments of the method, the computing of the deviations from parallelism between pairs of internal facets includes computing (two) sets of deviations in pitch $\{\varepsilon_{ij,p}\}_{i,j}$ and/or in roll $\{\varepsilon_{ij,r}\}_{i,j}$ between the internal facets in each of the pairs of internal facets. The indices i and j range over distinct internal facet pairs (from the pairs of internal facets). $\varepsilon_{ij,p}$ and $\varepsilon_{ij,r}$ are deviations in pitch and in roll, respectively, between an i-th and a j-th of the internal facets. According to some such embodiments, the $\varepsilon_{ij,p}$ and the $\varepsilon_{ij,r}$ are computed via $\varepsilon_{ij,p}=\delta_{ij,p}/(2n_s)=(x_i-x_j))/(2 n_s \cdot f)$ and $\varepsilon_{ij,r}=\delta_{ij,r}/(2n_s)=(y_i-y_j)/(2n_s \cdot f)$, respectively. $\delta_{ij,p}$ is a deviation in pitch between an i-th of the light beams in the second plurality, induced by reflection off the i-th internal facet, and a j-th of the light beams in the second plurality, induced by reflection off the j-th internal facet. $\delta_{ij,r}$ is a deviation in roll between the i-th of the light beams in the second plurality and the j-th of the light beams in the second plurality. $\{(x_k,y_k)\}_{k=1}^N$ is a set of two-dimensional vectors specifying locations of the spots on the image sensor, or against the graduated reticle of the eyepiece, induced by the light beams in the second plurality. The index k labels the spot. N is the number of the internal facets. f is a focal length of a focusing lens or a focusing lens assembly configured to focus the second plurality of light beams light beams on the image sensor or onto the eyepiece.

According to some embodiments of the method, the stage of computing the deviation from parallelism comprises computing a maximum deviation in pitch (i.e. a range of deviation in pitch) between the internal facets $\varepsilon_{max,p}= (\max\{x_i\}_i-\min\{x_i\}_i)/(2n_s \cdot f)$ and/or a maximum deviation in roll (i.e. a range of deviation in roll) between the internal facets $\varepsilon_{max,r}=(\max\{y_i\}_i-\min\{y_i\}_i)/(2 n_s \cdot f)$. $\{(x_i,y_i)\}_{i=1}^N$ is a set of two-dimensional vectors specifying locations (e.g. center points) of the spots on the image sensor, or against the graduated reticle of the eyepiece, induced by the light beams in the second plurality. The index i labels the spot. N is a number of the internal facets. f is a focal length of a focusing lens or a focusing lens assembly configured to focus the light beams in the second plurality on the image sensor or onto the eyepiece.

According to some embodiments of the method, in the stage of positioning the sample and the FOE, the sample and the FOE are positioned such that the second surface of the FOE is parallel to the first surface of the sample.

According to some embodiments of the method, the sample and the FOE are positioned such that a first area on the first surface of the sample is fully contacted by the second surface of the FOE. The first area is defined by a section of the sample including the internal facets.

According to some embodiments of the method, in the stage of computing the deviation from parallelism, deviations from parallelism between pairs of adjacent internal facets, from the two or more internal facets, are computed.

According to some embodiments of the method, in the stage of computing the deviation from parallelism, deviations from parallelism of internal facets, from the two or more internal facets, relative to a reference internal facet (e.g. a side most internal facet), from the two or more internal facets, are computed.

According to some embodiments of the method, the first surface of the FOE is coated by an anti-reflective coating.

According to some embodiments of the method, the method further includes applying a shape-compliant interface between the FOE and the sample. The shape-compliant interface has the about same refractive index as the substrate. According to some such embodiments, the shape-compliant interface may be a liquid, a gel, or a paste.

According to some embodiments of the method, an autocollimator is used to generate the first plurality of light beams and to focus the light beams in the second plurality onto a light sensing component, which is used to sense the second plurality of light beams.

According to some embodiments of the method, the second plurality of light beams includes light beams returned from the sample via the first surface of the sample and via the FOE.

According to some embodiments of the method, the sample includes an external and flat second surface, which is opposite to the first surface of the sample. Prior to exiting the sample via the first surface of the sample, the returned light beams are reflected off the second surface of the sample.

According to some embodiments of the method, the internal facets of the sample are perpendicular to the first surface of the sample. The second surface of the sample is parallel to the first surface of the sample.

According to some embodiments of the method, adjacent internal facets of the sample are spaced apart at regular intervals. The first inclination angle is equal to about (90°−arctan($2d_1/d_2$)), that is, the inclination angle σ is equal to 90 degrees minus arctan($2d_1/d_2$). $d_1$ is a distance between the first surface of the sample and the second surface of the sample. $d_2$ is a distance between adjacent internal facets of the sample.

According to some embodiments of the method, the first inclination angle is such that a ratio of a power of the second plurality of light beams and a power of the first plurality of light beams is about maximized.

According to some embodiments of the method, the sample includes an external and flat second surface, which is opposite to the first surface of the sample. The second plurality of light beams includes light beams exiting the sample via the second surface of the sample.

According to some embodiments of the method, the method further includes, prior to the stage of projecting the first plurality of light beams, providing a second optical element (SOE). The SOE has a refractive index about equal to $n_s$. The SOE includes an external and flat first surface and an external and flat second surface. The second surface of the SOE is opposite to the first surface of the SOE and is inclined relative to the first surface of the SOE at an acute second inclination angle. The stage of positioning the sample and the FOE further includes positioning the SOE and/or the sample, such that the second surface of the SOE is adjacent to the second surface of the sample. The second plurality of light beams includes light beams, which, following exit thereof out of the sample, via the second surface of the sample, and transmission into the SOE, exit the SOE via the first surface of the SOE. According to some such embodiments, the SOE has a refractive index equal to $n_s$.

According to some embodiments of the method, in the stage of positioning the sample and the FOE, the sample, the FOE, and the SOE are positioned such that the second surface of the FOE is parallel to the first surface of the sample and the second surface of the SOE is parallel to the second surface of the sample.

According to some embodiments of the method, the second inclination angle is about equal to the first inclination angle, so that each of the second plurality of light beams exits the SOE about normally to the first surface of the SOE. According to some such embodiments, the second inclination angle is equal to the first inclination angle.

According to some embodiments of the method, wherein the internal facets of the sample are perpendicular to the first surface of the sample and the second surface of the sample is parallel to the first surface of the sample, adjacent internal facets of the sample are spaced apart at regular intervals. Each of the first inclination angle and the second inclination angle is equal to about (90°−arctan($d_1/d_2$)), that is, the inclination angle σ is equal to 90 degrees minus arctan($d_1/d_2$). $d_1$ is a distance between the first surface of the sample and the second surface of the sample. $d_2$ is a distance between adjacent internal facets of the sample.

According to some embodiments of the method, the first inclination angle and the second inclination angle are such that a ratio of a power of the second plurality of light beams and a power of the first plurality of light beams is about maximized.

According to some embodiments of the method, the SOE is a prism. According to some such embodiments, the SOE is a triangular prism.

According to some embodiments of the method, the sample, the FOE, and the SOE are positioned such that a first area on the first surface of the sample is fully contacted by the second surface of the FOE and a second area of the sample is fully contacted by the second surface of the SOE. The first area and the second area are defined by a section of the sample including the internal facets. The second area is opposite to the first area.

According to some embodiments of the method, the first surface of the SOE is coated by an anti-reflective coating.

According to some embodiments of the method, the method further includes applying between the FOE and the sample, and between the SOE and the sample, a shape-compliant interface. The shape-compliant interface has the about same refractive index as the substrate. According to some such embodiments, the shape-compliant interface may be a liquid, a gel, or a paste.

According to an aspect of some embodiments, there is provided an optical-based system for metrology of a sample, having a substrate with a refractive index $n_s$ and two or more internal facets, which are embedded in the substrate, nominally parallel, and about perpendicular relative to an external and flat first surface of the sample. The system includes a first optical element (FOE) and an optical setup including a light source, optical equipment, and a light sensing component. The FOE has a refractive index about equal to $n_s$ and includes an external and flat first surface and an external and flat second surface. The second surface of the FOE is opposite to the first surface of the FOE and is inclined relative to the first surface of the FOE at an acute first inclination angle. The optical setup is configured to enable positioning the sample and/or the FOE, such that (i) the second surface of the FOE is adjacent to the first surface of the sample, and (ii) when so positioned (i.e. when the second surface of the FOE is adjacent to the first surface of the sample), a first plurality of light beams, generatable by the light source, will impinge on the first surface of the FOE about normally thereto. The FOE is further configured to focus on the light sensing component a second plurality of light beams exiting the sample following passage of the light beams in the first plurality via the FOE, transmission thereof into the sample, and reflection once off the internal facets, thereby enabling measurement of angular deviations between light beams in the second plurality. The angular deviations between the light beams in the second plurality are indicative of deviation from parallelism between the internal facets.

According to some embodiments of the system, the FOE has a refractive index equal to $n_s$.

According to some embodiments of the system, the optical setup is configured to enable positioning the second surface of the FOE adjacent to the first surface of the sample, such that a first plurality of light beams, generatable by the light source, will impinge on the first surface of the FOE normally thereto.

According to some embodiments of the system, the optical equipment includes a collimating lens, or a collimating lens assembly, configured to collimate light beams generated by the light source, thereby preparing the first plurality of light beams.

According to some embodiments of the system, the light source is a monochromatic light source.

According to some embodiments of the system, the light source is a laser source.

According to some embodiments of the system, the optical equipment includes a focusing lens, or a focusing lens assembly, configured to focus on the light sensing component the light beams in the second plurality.

According to some embodiments of the system, the light sensing component includes an image sensor configured to sense the second plurality of light beams.

According to some embodiments of the system, the light sensing component is or includes a camera.

According to some embodiments of the system, the light sensing component includes an eyepiece assembly.

According to some embodiments of the system, the optical setup is configured to enable positioning the sample and/or the FOE, such that the second surface of the FOE is parallel to the first surface of the sample.

According to some embodiments of the system, the optical setup is configured to enable positioning the sample and the FOE such that a first area on the first surface of the sample is fully contacted by the second surface of the FOE. The first area is defined by a section of the sample including the internal facets.

According to some embodiments of the system, the sample is shaped as a thin slab or an elongated box.

According to some embodiments of the system, the sample is a one-dimensional reflective waveguide or a two-dimensional reflective waveguide.

According to some embodiments of the system, the FOE is a prism. According to some such embodiments, the FOE is a triangular prism.

According to some embodiments of the system, the optical setup further includes a translatable slitted or apertured optical mask, and/or a plurality of shutters, configured to enable inspecting the internal facets one at a time.

According to some embodiments of the system, the sensed data includes measured intensities of pixels making up spots on the image sensor. Each of the spots is induced by a respective light beam in the second plurality.

According to some embodiments of the system, the system further includes a computational module configured to compute the deviation from parallelism between the internal facets based on the sensed data.

According to some embodiments of the system, as part of the computing of the deviation from parallelism, the computational module is configured to compute the angular deviations between the light beams in the second plurality (based on the sensed data).

According to some embodiments of the system, the computational module is configured it compute quantities $\varepsilon_{avg}$ and/or $\varepsilon_{max}$. $\varepsilon_{avg}$ is equal to $$\frac{1}{M}\sum_{i}, j > i\varepsilon_{ij}.$$

$\varepsilon_{max}$ is equal to $\max\{\varepsilon_{ij}\}_{i,j>i}$ or $$\sqrt{(\max\{x_i\}_i - \min\{x_i\}_i)^2 + (\max\{y_i\}_i - \min\{y_i\}_i)^2}/(2n_s \cdot f). \; \varepsilon_{ij} =$$

$$\sqrt{(x_i - x_j)^2 + (y_i - y_j)^2}/(2n_s \cdot f). \; \{(x_k, y_k)\}_{k=1}^N$$

is a set of two-dimensional vectors specifying locations of an i-th and j-th spot on the image sensor (formed by the light beams in the second plurality), or against the graduated reticle of the eyepiece. N is the number of the internal facets. M is the number of distinct internal facet pairs (i.e. M=N·(N−1)/2). f is a focal length of a focusing lens or a focusing lens assembly configured to focus the returned light beams on the image sensor.

According to some embodiments of the system, wherein the optical setup further includes a translatable slitted or apertured optical mask, and/or a plurality of shutters, configured to enable inspecting the internal facets one at a time, the computational module is configured to compute deviations from parallelism between pairs of internal facets, from the two or more internal facets. According to some such embodiments, the pairs of internal facets include pairs of adjacent internal facets.

According to some embodiments of the system, as part of the computing of the deviations from parallelism between pairs of internal facets, the computational module is configured to compute sets of deviations in pitch $\{\varepsilon_{ij,p}\}_{i,j}$ and/or in roll $\{\varepsilon_{ij,r}\}_{i,j}$ between the internal facets in each of the pairs of internal facets. The indices i and j range over distinct internal facet pairs (from the pairs of internal facets). $\varepsilon_{ij,p}$ and $\varepsilon_{ij,r}$ are deviations in pitch and in roll, respectively, between an i-th and a j-th of the internal facets. According to some such embodiments, the $\varepsilon_{ij,p}$ and the $\varepsilon_{ij,r}$ are computed via $\varepsilon_{ij,p}=\delta_{ij,p}/(2n_s)=(x_i-x_j)/(2n_s \cdot f)$ and $\varepsilon_{ij,r}=\delta_{ij,r}/(2n_s)=(y_i-y_j)/(2n_s \cdot f)$, respectively. $\delta_{ij,p}$ is a deviation in pitch between an i-th of the light beams in the second plurality, induced by reflection off the i-th internal facet, and a j-th of the light beams in the second plurality, induced by reflection off the j-th internal facet. $\delta_{ij,r}$ is a deviation in roll between the i-th of the light beams in the second plurality and the j-th of the light beams in the second plurality. $\{(x_k, y_k)\}_{k=1}^N$ is a set of two-dimensional vectors specifying locations of the spots on the image sensor, induced by the light beams in the second plurality. The index k labels the light beam. N is the number of the internal facets. f is a focal length of a focusing lens or a focusing lens assembly configured to focus the second plurality of light beams light beams on the image sensor.

According to some embodiments of the system, the computational module is configured to, as part of computing the deviation from parallelism between the internal facets, compute a maximum deviation in pitch (i.e. a range of deviation in pitch) between the internal facets $\varepsilon_{max,p}=(\max\{x_i\}_i-\min\{x_i\}_i)/(2n_s \cdot f)$ and/or a maximum deviation in roll (i.e. a range of deviation in roll) between the internal facets $\varepsilon_{max,r}=(\max\{y_i\}_i-\min\{y_i\}_i)/(2n_s \cdot f)$. $\{(x_i, y_i)\}_{i=1}^N$ is a set of two-dimensional vectors specifying locations (e.g. center points) of the spots on the image sensor induced by the light beams in the second plurality. The index i labels the spot. N is a number of the internal facets. f is a focal length of a focusing lens or a focusing lens assembly configured to focus the light beams in the second plurality on the image sensor.

According to some embodiments of the system, wherein the optical setup is configured to enable positioning the sample and/or the FOE such that the second surface of the FOE is parallel to the first surface of the sample.

According to some embodiments of the system, the optical setup is configured to enable positioning the sample and/or the FOE such that a first area on the first surface of the sample is fully contacted by the second surface of the FOE. The first area is defined by a section of the sample including the internal facets.

According to some embodiments of the system, as part of computing the deviation from parallelism, the computational module is configured to compute deviations from parallelism between pairs of adjacent internal facets from the two or more internal facets.

According to some embodiments of the system, as part of computing the deviation from parallelism, deviations from parallelism of internal facets, from the two or more internal facets, relative to a reference internal facet, from the two or more internal facets, are computed.

According to some embodiments of the system, the first surface of the FOE is coated by an anti-reflective coating.

According to some embodiments of the system, the optical setup includes an autocollimator configured to generate the first plurality of light beams and focus the light beams in the second plurality on the light sensing component.

According to some embodiments of the system, the second plurality of light beams includes light beams returned from the sample via the first surface of the sample and via the FOE.

According to some embodiments of the system, the sample includes an external and flat second surface, which is opposite to the first surface of the sample. Prior to exiting the sample via the first surface of the sample, the returned light beams are reflected off the second surface of the sample. According to some embodiments of the system, the internal facets of the sample are perpendicular to the first surface of the sample. The second surface of the sample is parallel to the first surface of the sample.

According to some embodiments of the system, wherein adjacent internal facets of the sample are spaced apart at regular intervals. The first inclination angle is equal to about $(90°-\arctan(2d_1/d_2))$. $d_1$ is a distance between the first surface of the sample and the second surface of the sample. $d_2$ is a distance between adjacent internal facets of the sample.

According to some embodiments of the system, the first inclination angle is such that a ratio of a power of the second plurality of light beams and a power of the first plurality of light beams is about maximized.

According to some embodiments of the system, the sample includes an external and flat second surface, which is opposite to the first surface of the sample. The second plurality of light beams includes light beams exiting the sample via the second surface of the sample.

According to some embodiments of the system, the system further includes a second optical element (SOE). The SOE has a refractive index about equal to $n_s$. The SOE includes an external and flat first surface and an external and flat second surface. The second surface of the SOE is opposite to the first surface of the SOE and is inclined relative to the first surface of the SOE at an acute second inclination angle. The optical setup is additionally configured to enable positioning the sample and/or the SOE, such that the second surface of the SOE is adjacent to the second surface of the sample. According to some such embodiments, the SOE has a refractive index equal to $n_s$.

According to some embodiments of the system, the second plurality of light beams includes light beams, which, following exit thereof out of the sample, via the second surface of the sample, and transmission into the SOE, exit the SOE via the first surface of the SOE.

According to some embodiments of the system, the optical setup is further configured to position the sample and/or the SOE such that the second surface of the SOE is parallel to the second surface of the sample.

According to some embodiments of the system, the optical setup is further configured to enable positioning the sample and/or the SOE, such that a first area on the first surface of the sample is fully contacted by the second surface of the FOE, and a second area of the sample is fully contacted by the second surface of the SOE. The first area and second area are defined by a section of the sample including the internal facets Thee second area is opposite to the first area.

According to some embodiments of the system, the second inclination angle is about equal to the first inclination angle so that each of the second plurality of light beams exits the SOE about normally to the first surface of the SOE. According to some such embodiments, the second inclination angle is equal to the first inclination angle.

According to some embodiments of the system, wherein the internal facets of the sample are perpendicular to the first surface of the sample, and the second surface of the sample is parallel to the first surface of the sample, adjacent internal facets of the sample are spaced apart at regular intervals.

Each of the first inclination angle and the second inclination angle is equal to about $(90°-\arctan(d_1/d_2))$. $d_1$ is a distance between the first surface of the sample and the second surface of the sample. $d_2$ is a distance between adjacent internal facets of the sample.

According to some embodiments of the system, the SOE is a prism. According to some such embodiments, the SOE is a triangular prism.

According to some embodiments of the system, the first surface of the SOE is coated by an anti-reflective coating.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In the figures:

FIG. 10 presents a flowchart of an optical-based method for metrology of internal facets of samples, which corresponds to specific embodiments of the method of FIG. 8.

DETAILED DESCRIPTION

Figure 1A:
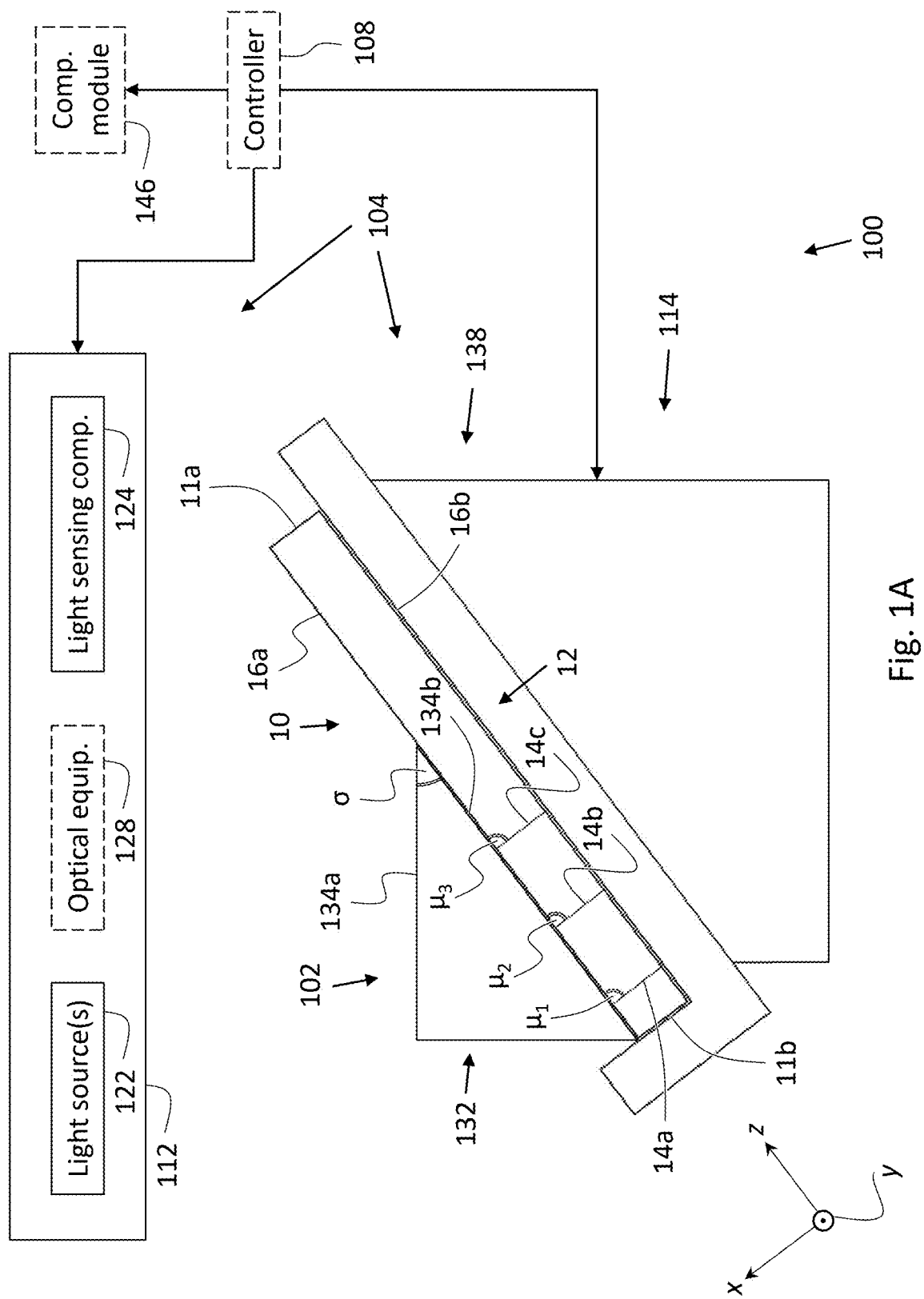
FIG. 1A schematically depicts an optical-based system for metrology of internal facets of samples and a sample mounted thereon, according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value. In particular, it is to be understood that the terms "about equal" and "equal to about" also cover exact equality.

As used herein, according to some embodiments, the terms "substantially" and "about" may be interchangeable.

For ease of description, in some of the figures a three-dimensional cartesian coordinate system is introduced. It is noted that the orientation of the coordinate system relative to a depicted object may vary from one figure to another. Further, the symbol ⊙ may be used to represent an axis pointing "out of the page", while the symbol ⊗ may be used to represent an axis pointing "into the page".

In the figures, optional elements and optional stages (in flowcharts) are delineated by a dashed line.

Throughout the description, vectors are represented by lowercase, upright letters in boldface (e.g. v).

The description includes quantitative relations between parameters in the form of equations. Consequently, to render the description clearer, throughout the description, certain symbols are used exclusively to label specific types of parameters and/or quantities. The vector "u" (including when superscript and/or subscripted) signifies a two-dimensional vector specifying coordinates of spots (e.g. on an image sensor). The Greek letter "ε" (including when superscript and/or subscripted) signifies an angle between planes or a magnitude of the angle. More specifically, the Greek letter "ε" is used to signify a deviation from parallelism between a pair of internal facets of a sample or a magnitude of a deviation from parallelism. The Greek letter "δ" (including when superscript and/or subscripted) signifies an angle between two vectors or a magnitude of an angle between two vectors. More specifically, the Greek letter "δ" is used to signify an angular deviation between the directions of propagation of two light beams. "δ" signifies the refractive index of a sample inspected using the disclosed systems and/or methods. "f" signifies the focal length of a focusing lens or lens assembly used to focus returned light beams on a light sensing component included in a disclosed system used to inspect a sample and/or used as part of a disclosed method used to inspect a sample. Thus, the symbols u, ε, δ, $n_s$, and f (as well as the symbols "μ", "σ", "Δ", which signify angles) should not be considered as being tied to a specific embodiment with respect to which they are first introduced in the text. In particular, specification of values, ranges of values, and/or constrains on the values (of components) of u and the parameters ε, δ, $n_s$, and f (as well as the parameters μ, σ, and Δ) in the context of one embodiment does not necessarily carry over to another embodiment.

Throughout the description, internal, flat surfaces (such as a flat boundary between two parts of a three-dimensional element or an internal flat layer of material incorporated into a three-dimensional element) of three-dimensional elements are referred to as "internal facets".

As used herein, an object may be said to "nominally" exhibit (i.e. be characterized by) a property, such as an inclination angle between flat surfaces of the sample, when the object is intended by design and fabrication to exhibit the property but, in practice, due to manufacturing tolerances, the property may actually be imperfectly exhibited.

Systems

According to an aspect of some embodiments, there is provided an optical-based system for metrology of samples (e.g. one-dimensional or two-dimensional reflective waveguides) including a substrate (constituting the bulk of the sample), characterized by a uniform refractive index, and two or more internal facets, which are embedded in the substrate and are nominally parallel and about perpendicular to at least to an external (first) surface of the sample (e.g. a major surface of a reflective waveguide). The system may be used to implement the optical-based method (for validating parallelism between internal facets of a sample) of FIG. 8.

The system includes (at least one) optical element (e.g. a prism) and an optical setup including a light source, a light sensing component, and, optionally, optical equipment. The optical equipment includes at least a collimating lens or collimating lens assembly configured collimate light generated by the light source, thereby preparing a first plurality of light beams.

The optical element has a refractive index about equal to that of the substrate and includes an external and flat first surface and, opposite thereto, an external and flat second surface. The second surface of the optical element is inclined relative to the first surface of the optical element at an acute (first) inclination angle. The optical setup is configured to enable positioning the sample and/or the optical element, such that (i) the second surface of the optical element is adjacent to the first surface of the sample, and (ii) when so positioned (i.e. when the second surface of the optical element positioned is adjacently to the first surface of the sample), a first plurality of light beams, generatable by the light source, will impinge on the first surface of the optical element about normally thereto.

The optical equipment may include a focusing lens or focusing lens assembly configured to focus on the light sensing component a second plurality of light beams, so as to allow measurement of angular deviations between the light beams in the second plurality. The second plurality of light beams includes light beams which exit the sample following passage of the light beams in the first plurality via (i.e. through) the optical element, transmission thereof into the sample, and reflection once off the internal facets. Based on the (measured) angular deviations between the light beams in the second plurality, deviation(s) from parallelism between the internal facets may be computed.

According to some embodiments, such as the embodiments described below in the descriptions of FIGS. 1A-5, following the reflection off the internal facets, the reflected light beams are reflected off a second surface of the sample, which is opposite to the first surface of the sample. These doubly-reflected (i.e. twice reflected within the sample) light beams are transmitted out of the sample and into the optical element via the first surface of the sample and the second surface of the optical element and exit (e.g. are refracted out of) the optical element via the first surface of the optical element (thereby obtaining the second plurality of light beams).

According to some embodiments, such as the embodiments described below in the descriptions of FIGS. 6A-7, the system includes a second optical element (SOE), which may be similar to the first optical element (FOE). The SOE has a refractive index about equal to that of the substrate and includes an external and flat first surface and an external and flat second surface. The second surface of the SOE is inclined relative to the first surface of the SOE at an acute second inclination angle. The optical setup is additionally configured to enable positioning the sample and/or the SOE, such that the second surface of the SOE is adjacent to the second surface of the sample. Following the reflection off the internal facets, the reflected light beams (i) are transmitted out of the sample and into the second optical element via a second surface of the sample, which is opposite to the first surface of the sample, and the second surface of the SOE, and (ii) exit (e.g. are refracted out of) the SOE via the first surface of the SOE (thereby obtaining the second plurality of light beams).

According to some embodiments, wherein the second surface of the sample is parallel to the first surface of the sample (e.g. when the first surface and second surface of the sample are major surfaces of a reflective waveguide), the second inclination angle may be about equal to the first inclination angle, thereby ensuring that the light beams in the second plurality exit the SOE about normally to the first surface of the SOE (which may help reduce dispersion).

FIG. 1A schematically depicts an optical-based system 100 for metrology of internal facets in samples, according to some embodiments. Optical-based system 100 is configured for validating parallelism between internal facets of a sample. More specifically, FIG. 1A presents a cross-sectional sideview of system 100 and a sample 10, according to some embodiments. (It is to be understood that sample 10 does not constitute a part of system 100.)

Sample 10 includes a substrate 12, which is light transmissive, and two or more internal facets 14, which are embedded in substrate 12. Sample 10 further includes an external first surface 16a (also referred to "sample first surface") and an external second surface 16b (also referred to "sample second surface"). Sample second surface 16b is opposite to sample first surface 16a. Each of sample first surface 16a and sample second surface 16b may be flat. According to some embodiments, and as depicted in FIGS. 1A-1E, sample second surface 16b is parallel to sample first surface 16a. According to some embodiments, each of internal facets 14 constitutes a thin semi-reflective or reflective layer embedded within substrate 12. According to some embodiments, one or more of internal facets 14 may be a thin film or a partial mirror. According to some embodiments, one or more of internal facets 14 may be composed of or include glass and/or a dielectric material. According to some embodiments, substrate 12 may be a one-dimensional or a two-dimensional reflective waveguide (also termed "geometrical waveguide"). According to some such embodiments, sample first surface 16a and sample second surface 16b constitute major surfaces of the waveguide. According to some embodiments, substrate 12 may be made of glass, crystal, or a transparent polymer.

Figure 1B:
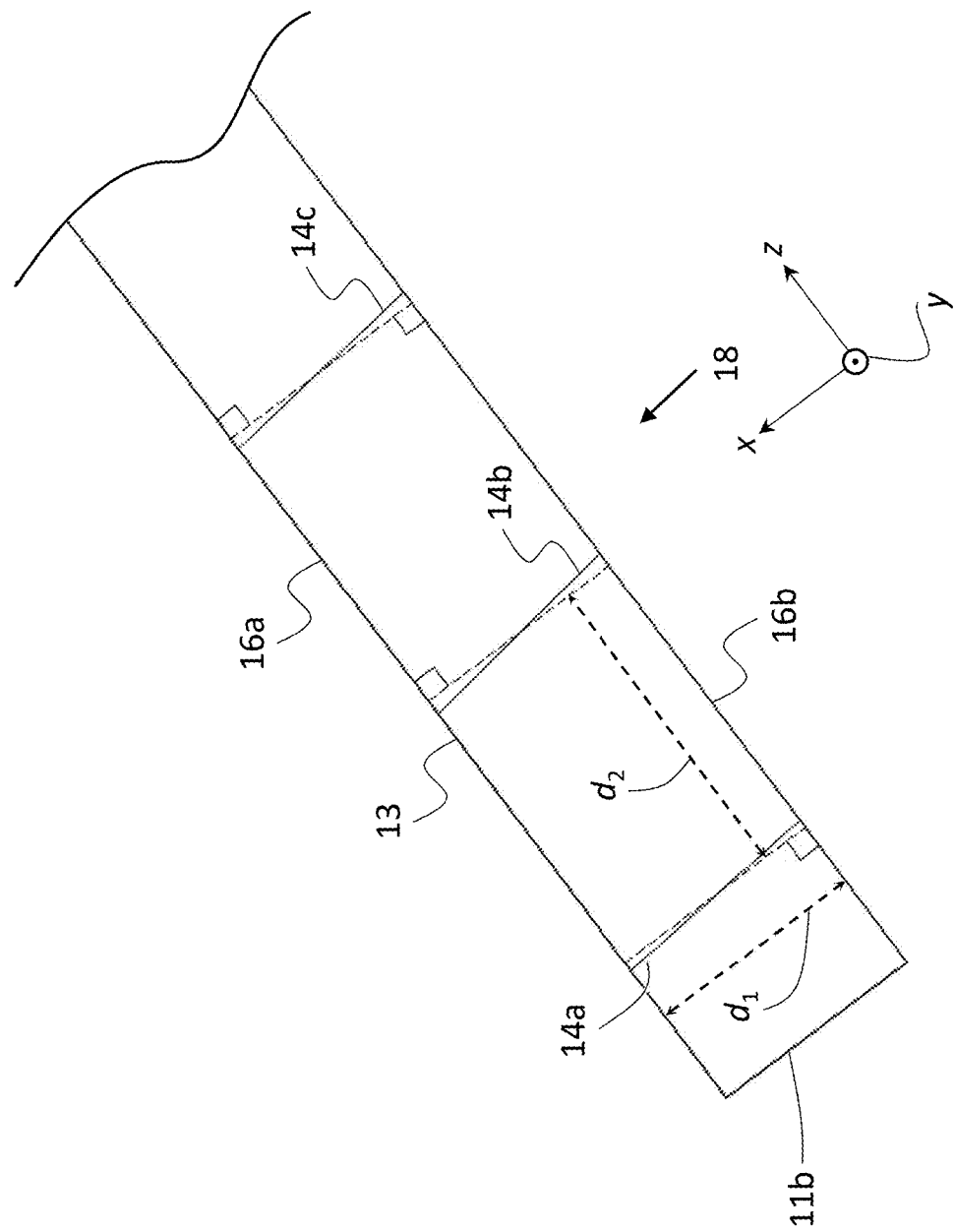
FIG. 1B is an enlarged cross-sectional view of a section of the sample of FIG. 1A, according to some embodiments.
Figure 1C:
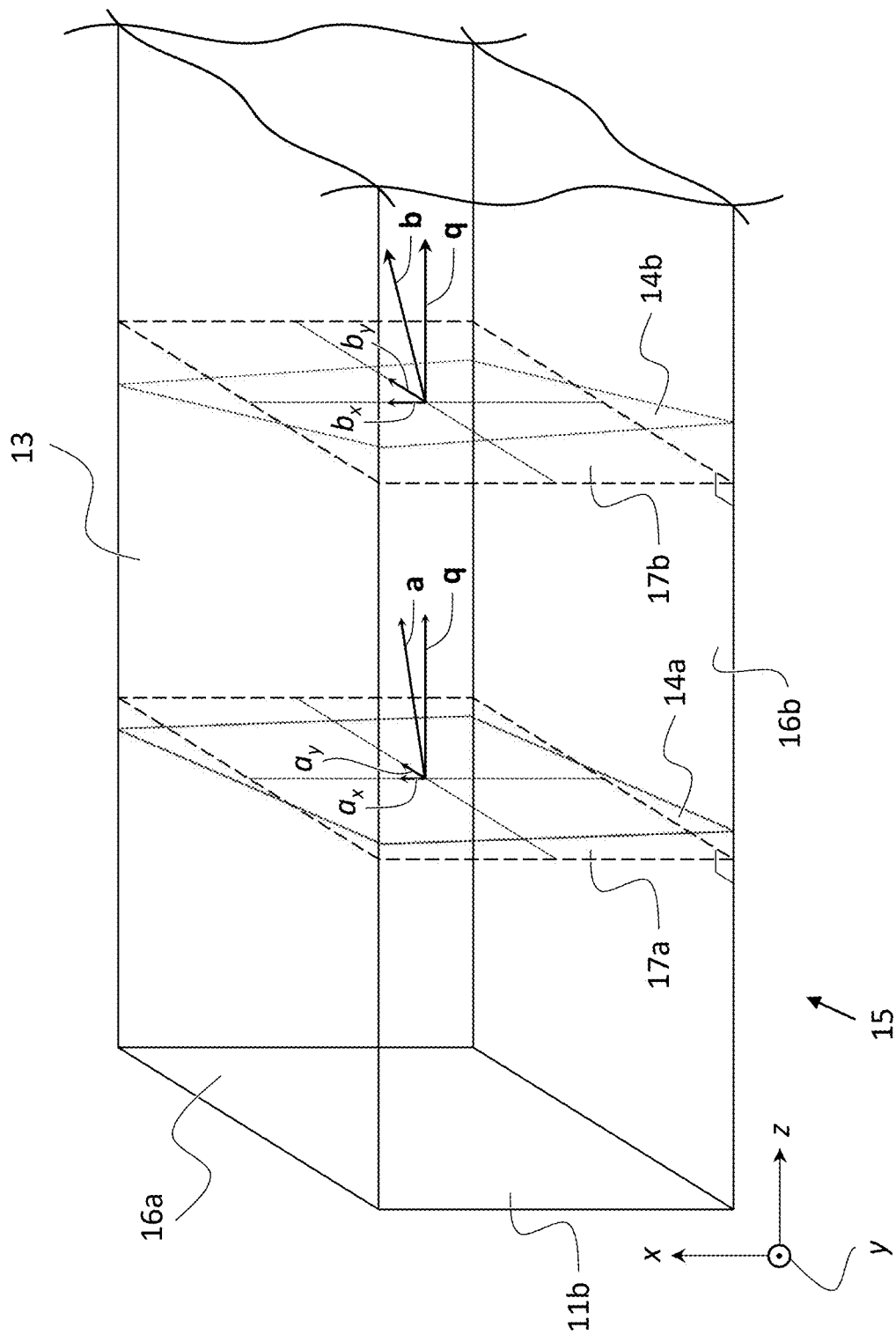
FIG. 1C is an enlarged perspective view of a section of the sample of FIG. 1A, according to some embodiments.

A sample section 18 of sample 10 corresponds to the part (e.g. segment) of substrate 12 in which internal facets 14 are located (while the section of sample 10, which is complementary to sample section 18 may be devoid of any of internal facets 14). Referring also to FIGS. 1B and 1C, FIG. 1B provides an enlarged view of sample section 18, according to some embodiments. As a non-limiting example, intended to facilitate the description by making it more concrete, in FIGS. 1A and 1B internal facets 14 are shown as including three internal facets: a first internal facet 14a, a second internal facet 14b, and a third internal facet 14c with second internal facet 14b being disposed between first internal facet 14a and third internal facet 14c. The skilled person will readily recognize that the three-internal facets case encompasses the essentials of any number of internal facets (e.g. 4, 5, 10, or more). FIG. 1C provides a perspective view of an end portion 15 of sample section 18, which includes first internal facet 14a and second internal facet 14b, according to some embodiments.

Internal facets 14 are nominally parallel. That is, according to the intended design of sample 10 internal facets 14 are parallel. In actuality, due to fabrication imperfections, internal facets 14 may typically not exhibit perfect parallelism. According to some embodiments, each of internal facets 14 is nominally inclined relative to sample first surface 16a at a nominal angle $\mu_{nom}$ (spanned on a plane parallel to the zx plane), which is about equal to 90°. According to some such embodiments, and as depicted in FIGS. 1A-1E, internal facets 14 are nominally perpendicular to sample first surface 16a (and sample second surface 16b in embodiments wherein sample second surface 16b is parallel to sample first surface 16a), i.e. $\mu_{nom}=90°$. In actuality, each of internal facets 14 may be oriented at a respective actual angle, which slightly differs from the nominal angle $\mu_{nom}$. First internal facet 14a, second internal facet 14b, and third internal facet 14c are oriented at a first angle $\mu_1$, a second angle $\mu_2$, and a third angle $\mu_3$, respectively, relative to sample first surface 16a.

It is noted that due to fabrication imperfections, the actual angles $\mu_i$ (i=1, 2, 3) may differ from one another, and/or the nominal angle $\mu_{nom}$, not only in magnitude but also by the respectively subtending planes. For example, given that $\mu_{nom}$ is subtended on a first plane parallel to the zx plane, $\mu_1$ may be subtended on a second plane, which is tilted with respect to the first plane. Similarly, $\mu_2$ may be subtended on a third plane, which is tilted with respect to the first plane and/or the second plane. Put differently, denoting by a, b, and c (a and b are shown in FIG. 1C) unit vectors normal to first internal facet 14a, second internal facet 14b, and third internal facet 14c, respectively, most generally, a≠b, b≠c, and c≠a.

As used herein, the "pitch of an internal facet" refers to the angle by which the internal facet is rotated about the y-axis relative to the nominal orientation thereof. The "roll of an internal facet" refers to the angle by which the internal facet is rotated about the x-axis relative to the nominal orientation thereof.

The nominal orientation of internal facets 14 is indicated in FIG. 1C by a unit vector q (i.e. in the absence of fabrication imperfections a=b=c=q). Per the choice of coordinate system of FIG. 1C, q points along the direction defined by the z-axis. A first plane 17a (delineated by a dashed line) indicates the nominal positioning of first internal facet 14a. Indicated on first plane 17a are $a_x$ and $a_y$: the x and y components, respectively, of a ($a=a_x\hat{x}+a_y\hat{y}+a_z\hat{z}$). First internal facet 14a is shown differing from first plane 17a in both pitch and in roll as evinced by the non-vanishing x and y components (i.e. $a_x$ and $a_y$), respectively, of a. A second plane 17b (delineated by a dashed line) indicates the nominal positioning of second internal facet 14b. Indicated on second plane 17b are $b_x$ and $b_y$: the x and y components, respectively, of b ($b=b_x\hat{x}+b_y\hat{y}+b_z\hat{z}$). Second internal facet 14b is shown differing from second plane 17b in both pitch and roll as evinced by the non-vanishing x and y components (i.e. b, and by), respectively, of b. First internal facet 14a and second internal facet 14b are shown differing from one another in both pitch and in roll (i.e. in FIG. 1C $b_x>a_x$ and $b_y>a_y$.).

Each of sample first surface 16a and sample second surface 16b extends from a first end 11a to a second end 11b of sample 10. Sample section 18 defines an area 13 on sample first surface 16a positioned above (all of) internal facets 14.

According to some embodiments, system 100 includes an optical element 102, which is light transmissive, and an optical setup 104. System 100 may further include a controller 108 functionally associated with optical setup 104 and configured to control operation thereof. According to some embodiments, and as depicted in FIG. 1A, optical setup 104 includes an illumination and collection assembly (ICA) 112 and a holding infrastructure 114 for mounting thereon sample 10. According to some embodiments, and as elaborated on below, holding infrastructure 114 may include orienting infrastructure configured to allow controllably setting an orientation of sample 10. ICA 112 includes a light source 122 (or a plurality of light sources) and a light sensing component 124. According to some embodiments, light sensing component 124 may include an image sensor. According to some embodiments, the image sensor may be a CCD sensor or a CMOS sensor. According to some embodiments, light sensing component 124 may be a camera. Alternatively, according to some embodiments, light sensing component 124 may be an eyepiece assembly, which is configured for visual determination (i.e. by eye) of deviation between light rays focused onto the eyepiece assembly. According to some embodiments, ICA 112 may further include optical equipment 128 whose function is described below.

Optical element 102 includes a substrate 132, which constitutes the bulk of optical element 102 and which is made of a material having about the same refractive index (e.g. greater than $n_s-0.02$ and smaller than $n_s+0.02$) as substrate 12 of sample 10. According to some such embodiments, substrate 132 is made of a material having the same refractive index as substrate 12. Optical element 102 further includes an external first surface 134a (e.g. a first surface of substrate 132, which is external) and, opposite thereto, an external second surface 134b (e.g. a second surface of substrate 132, which is external). According to some embodiments, and as depicted in FIG. 1A, optical element first surface 134a is flat. According to some such embodiments, and as depicted in FIG. 1A, optical element second surface 134b is also flat and inclined with respect to optical element first surface 134a. According to some embodiments, optical element 102 is a prism. According to some such embodiments, the prism may be a triangular prism.

Figure 1D:
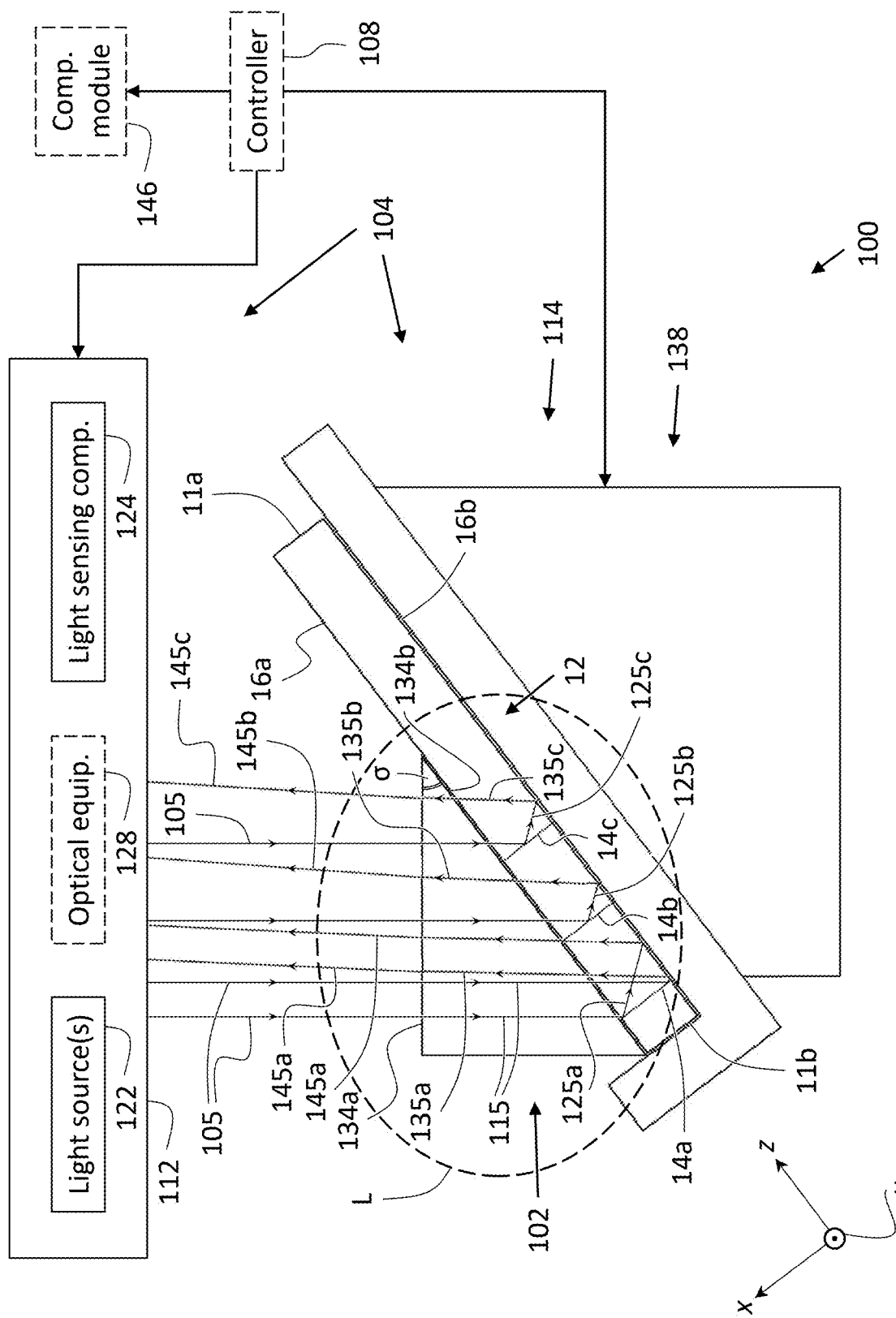
FIG. 1D schematically depicts the system of FIG. 1A in operation, during an inspection of the sample, according to some embodiments.

According to some embodiments, particularly embodiments wherein (i) sample first surface 16a and sample second surface 16b are parallel, (ii) internal facets 14 are nominally perpendicular to each of sample first surface 16a and sample second surface 16b, and (iii) adjacent internal facets are spaced at regular intervals, optical element second surface 134b may be inclined relative to optical element first surface 134a at an inclination angle σ, which is subtended in parallel to the zx plane and is equal to $(90°-\arctan(2d_1/d_2))$, that is, the inclination angle σ is equal to 90 degrees minus $\arctan(2d_1/d_2)$. Here $d_1$ is the distance between sample first surface 16a and sample second surface 16b, and $s_2$ is the distance between adjacent internal facets (e.g. internal facets 14a and 14b, internal facets 14b and 14c). The distances $d_1$ and $d_2$ are indicated by double-headed dashed arrows in FIG. 1B. The reason for the above choice of inclination angle is explained below in the description of FIGS. 1D and 1E. ICA 112 is configured to output a collimated light beam (as shown in FIGS. 1C and 1D), which is produced by light source 122, and, optionally, manipulated (e.g. collimated) by optical equipment 128. According to some embodiments, optical equipment 128 may include a collimating lens or a collimating lens assembly (not shown). Optical element 102 and ICA 112 (more precisely, illumination components of ICA 112) relative orientation may be set such that the light beam output by ICA 112 impinges on optical element first surface 134a normally, or at least about normally (e.g. to within 1°, 1.5°, or even 2° from normal incidence), to optical element first surface 134a.

Optical element 102 and optical setup 104 may be configured to ensure that the incident light beam is at most negligibly reflected off optical element first surface 134a, or that any portion directly reflected from optical element first surface 134a is distinguishable from returned light beams resulting from transmission into optical element 102 and sample 10, reflection off internal facets 14, and repassage through optical element 102. As explained below in the description of FIGS. 1C and 1D, the deviation(s) from parallelism between internal facets 14 is computed based on sensed data of the returned light beams (i.e. by measuring one or more parameters characterizing each of the returned light beams). According to some embodiments, negligible reflection of the incident light beam off optical element first surface 134a may be accomplished by coating (if not already coated) optical element first surface 134a by an anti-reflective coating. The coating may be permanent or temporary.

Figure 1E:
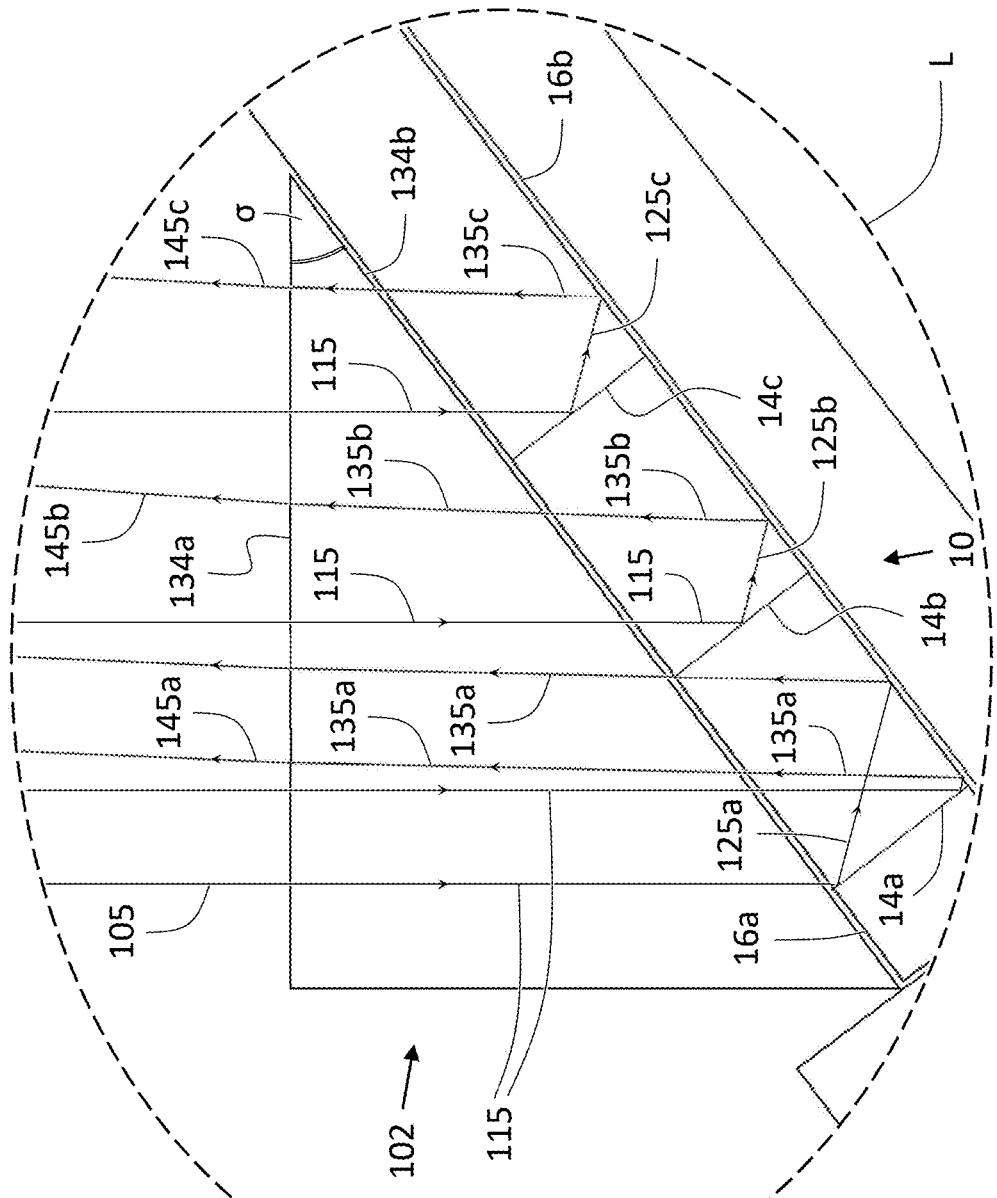
FIG. 1E provides an enlarged view of a part of FIG. 1D, according to some embodiments.

In order not to encumber FIGS. 1D and 1E, light beams reflected off optical element first surface 134a are not shown.

Alternatively, according to some embodiments, the incident light beam may be slightly tilted by an angle Δ relative to the normal to optical element first surface 134a, so as to ensure that the propagation direction of light directly reflected off optical element first surface 134a sufficiently differs from each of the propagation directions of the returned light beams (when exiting optical element 102 after reflection off internal facets 14). In such embodiments, the incident light beam may be selected to be monochromatic in order to minimize dispersion on transmission thereof into optical element 102. According to some embodiments, $0.3°≤|Δ|≤0.5°$, $0.2°≤|Δ|≤0.7°$, or even $0.1°≤|Δ|≤1°$. Each possibility corresponds to different embodiments.

According to some embodiments, light source 122 may be configured to produce a monochromatic light beam (so that the light beam output by ICA 112 is monochromatic). According to some embodiments, light source 122 may be a laser source (so that the light beam output by ICA 112 is a laser beam). According to some embodiments, wherein light source 122 is a laser source, ICA 112 may be configured to output an expanded laser beam, which is collimated. According to some such embodiments, optical equipment 128 may include a beam expander (not shown) configured to increase the diameter of the laser beam. According to some embodiments, such as embodiments wherein sample 10 is a one-dimensional waveguide, a diameter of the expanded laser beam (e.g. the greatest diameter when the cross-section of expanded laser beam defines an ellipse) may be about equal to a longitudinal dimension of area 13. According to some embodiments, such as embodiments wherein sample 10 is a two-dimensional waveguide, a cross-sectional area of the expanded laser beam may be of a size about equal to that of area 13.

It is noted that a polychromatic incident light beam may be employed in embodiments wherein optical element first surface 134a is coated by an anti-reflective coating, so long as the incident light beam is projected normally to optical element first surface 134a (thereby preventing or at least significantly reducing dispersion).

According to some embodiments, light source 122, light sensing component 124, and at least some of optical equipment 128, may constitute an autocollimator or constitute components of an autocollimator. According to some embodiments, the autocollimator is a digital autocollimator or an electronic autocollimator. According to some embodiments, the autocollimator is a laser autocollimator. According to some embodiments, the autocollimator is a visual autocollimator.

According to some embodiments, optical equipment 128 may further include a translatable slitted or apertured optical mask (not shown; such as the translatable slitted optical mask of FIG. 2) configured to control an incidence location of a light beam (e.g. a laser beam) on optical element first surface 134a, thereby allowing to separately inspect each of internal facets 14. Alternatively, according to some embodiments, optical equipment 128 may further include a plurality of shutters configured to allow (enable) separate inspection of each of internal facets 14.

According to some embodiments, holding infrastructure 114 may be configured to allow controllably setting the orientation between sample 10 and optical element 102. In particular, holding infrastructure 114 may be configured to allow orienting sample 10 and/or optical element 102, such that sample first surface 16a is adjacent and parallel to optical element second surface 134b. According to some embodiments, holding infrastructure 114 may further be configured to orient optical element 102, such that incident light beams, output by ICA 112, will normally (i.e. perpendicularly) impinge on optical element first surface 134a. As a non-limiting example, according to some embodiments, holding infrastructure 114 may include an orientable stage assembly 138 or an orientable stage (e.g. a dual axis stage).

Stage assembly 138 is configured to allow mounting thereon a sample, such as sample 10, and adjusting the pitch angle and/or the roll angle of the sample. According to some embodiments, stage assembly 138 may be configured to allow maneuvering a sample mounted thereon in each of six degrees of freedom. According to some embodiments, stage assembly 138 may include two goniometers (such as the goniometers depicted in FIG. 5; not shown in FIG. 1A): a pitch goniometer and a roll goniometer disposed one on top of the other. According to some such embodiments, stage assembly 138 may include a platform (such as the inclined platform depicted in FIG. 5; not shown in FIG. 1A), which is configured to (i) be positioned on the top one of the two goniometers and (ii) have placed thereon sample 10. In some such embodiments, optical element 102 may be positioned on sample 10 and supported thereby. Alternatively, according to some embodiments, holding infrastructure 114 may include orientable holding gear (not shown) configured to hold and controllably orient optical element 102. According to some embodiments, holding infrastructure 114 may be functionally associated with controller 108 and is configured to be controlled thereby.

Referring also to FIGS. 1D and 1E, FIG. 1D presents a cross-sectional sideview of system 100 and sample 10 with sample 10 undergoing inspection by system 100, according to some embodiments. FIG. 1E provides an enlarged view of a part of FIG. 1D delineated by a dashed line L. In operation, according to some embodiments, an expanded and collimated incident light beam, indicated by arrows 105 (not all of which are numbered), is projected on optical element first surface 134a. According to some embodiments, particularly embodiments wherein optical element first surface 134a is coated by an anti-reflective coating, the incident light beam may be projected normally to optical element first surface 134a.

The incident light beam (or at least a portion thereof) is transmitted into optical element 102 via optical element first surface 134a, thereby obtaining a transmitted light beam. The transmitted light beam is indicated by arrows 115 (not all of which are numbered). The transmitted light beam travels across optical element 102, crosses (i.e. passes) into sample 10 via optical element second surface 134b and sample first surface 16a, and propagates towards internal facets 14. The transmitted light beam is reflected off internal facets 14 towards sample second surface 16b.

More specifically, since internal facets 14 may slightly differ from one another in the respective orientations thereof, the transmitted light beam may be reflected at slightly different angles off each of internal facets 14, respectively. Accordingly, a plurality of reflected light beams may be obtained, which slightly differ in the respective propagation directions thereof. A first reflected light beam—corresponding to the portion of the transmitted light beam reflected off first internal facet 14a—is indicated by an arrow 125a. A second reflected light beam—corresponding to the portion of the transmitted light beam reflected off second internal facet 14b—is indicated by an arrow 125b. A third reflected light beam—corresponding to the portion of the transmitted light beam reflected off third internal facet 14c—is indicated by an arrow 125c.

The reflected light beams are reflected (once more) off sample second surface 16b, exit sample 10 via sample first surface 16a, and reenter (i.e. are transmitted into) optical element 102 via optical element second surface 134b, as indicated by arrows 135a, 135b, and 135c. Following reentry into optical element 102, the doubly-reflected (i.e. twice reflected within sample 10) light beams travel to optical element first surface 134a and exit (e.g. are refracted out of) optical element 102, thereby obtaining a plurality of returned light beams: A first returned light beam—resulting from the refraction of the first doubly-reflected light beam (which is indicated by arrow 135a) out of optical element 102—is indicated by an arrow 145a. A second returned light beam—resulting from the refraction of the second doubly-reflected light beam (which is indicated by arrows 135b) out of optical element 102—is indicated by an arrow 145b. A third returned light beam—resulting from the refraction of the third doubly-reflected light beam (which is indicated by arrows 135c) out of optical element 102—is indicated by an arrow 145c. The returned light beams propagate towards ICA 112 and are focused by optical equipment 128 on light sensing component 124.

Light sensing component 124 is configured to allow obtaining from sensed data thereof (i.e. measurement data of the returned light beams obtained by light sensing component 124 or using light sensing component 124) angular deviations between pairs of the returned light beams focused thereon. From the angular deviations magnitudes of deviations from parallelism between internal facets 14 may be inferred, for example, as described in the description of FIGS. 2A and 2B below. According to some embodiments, the inclination angle σ is equal to $(90°-\arctan(2d_1/d_2))$. As apparent by perusing FIGS. 1D and 1E, the above choice of o ensures every light ray in the reflected light beams, is (or has at least a portion thereof) transmitted back into optical element 102 following reflection off sample second surface 16b without being reflected again by any of internal facets 14. Accordingly, the above choice of o may reduce losses and thereby improve detection of the returned light beams (e.g. by ensuring that the returned light beams form bright spots on a photosensitive surface of the image sensor). According to some embodiments, the inclination angle σ is equal to about $(90°-\arctan(2d_1/d_2))$.

According to some embodiments, wherein optical element first surface 134a is not coated by an anti-reflective coating, light projected on optical element first surface 134a, in addition to having a first portion thereof transmitted into optical element 102, will have a second portion thereof reflected off optical element first surface 134a. In such embodiments, in order to ensure that the returned light beams (i.e. the light beams returned through optical element 102 following reflection off internal facets 14) are distinguishable from the portion of the incident light beam, reflected off optical element first surface 134a, the incident light beam may be projected at a small (non-vanishing) incidence angle (relative to optical element first surface 134a). Thus, as depicted in FIG. 2B and detailed below, in embodiments wherein light sensing component 124 is an image sensor, while the spots formed by the returned light beams will typically cluster (i.e. be concentrated), the spot formed by the directly reflected portion of the incident light beam will fall markedly outside the cluster.

According to some embodiments, and as depicted in FIGS. 1A, 1D, and 1E optical element 102 may be positioned on (and, optionally, supported by) sample 10, such that optical element second surface 134b contacts all of sample first surface 16a, or at least all of area 13. In such embodiments, the transmitted light beam passes directly from optical element 102 into sample 10, and the reflected light beams pass directly from sample 10 into optical element 102.

According to some embodiments, optical element second surface 134b does not contact sample first surface 16a. If the incident light beam is not monochromatic, the space (unless filled as described below) between optical element 102 and sample 10 may lead to dispersion as the transmitted light beam exits optical element 102 via optical element second surface 134b. In embodiments wherein optical element second surface 134b and sample first surface 16a are parallel and sufficiently polished (and the refractive index of optical element 102 is equal to that of substrate 12), light beams of different frequencies will be realigned on entry into sample 10. Otherwise, in order to avoid or at least mitigate dispersion, according to some embodiments, light source 122 may be configured to produce a monochromatic light beam (e.g. a laser beam) and/or an index matching shape-compliant interface (not shown) may be inserted between sample 10 and optical element 102 (so as to be confined between sample first surface 16a and optical element second surface 134b). The shape-compliant interface may have about the same refractive index (e.g. greater than $n_s-0.02$ and smaller than $n_s+0.02$) as sample 10. The shape-compliant interface may be a liquid, gel, or paste characterized by a surface tension and/or adhesive properties, such as to maintain integrity and disposition thereof when confined in a narrow space. According to some embodiments, the shape-compliant interface may be a malleable material. Thus, a light beam propagating through optical element 102, the shape-compliant interface, and sample 10 will substantially maintain the propagation direction thereof on passing from optical element 102 into the shape-compliant interface and on passing from the shape-compliant interface into sample 10.

According to some embodiments, a shape-compliant interface (as described above) may also be used in order to prevent total internal reflection of the doubly-reflected light beams (that is, in embodiments wherein the inclination angle σ is such that the doubly-reflect light beams may impinge on optical element first surface 134a at an incidence angle greater than the critical angle defined by substrate 12 and air).

Figure 2A:
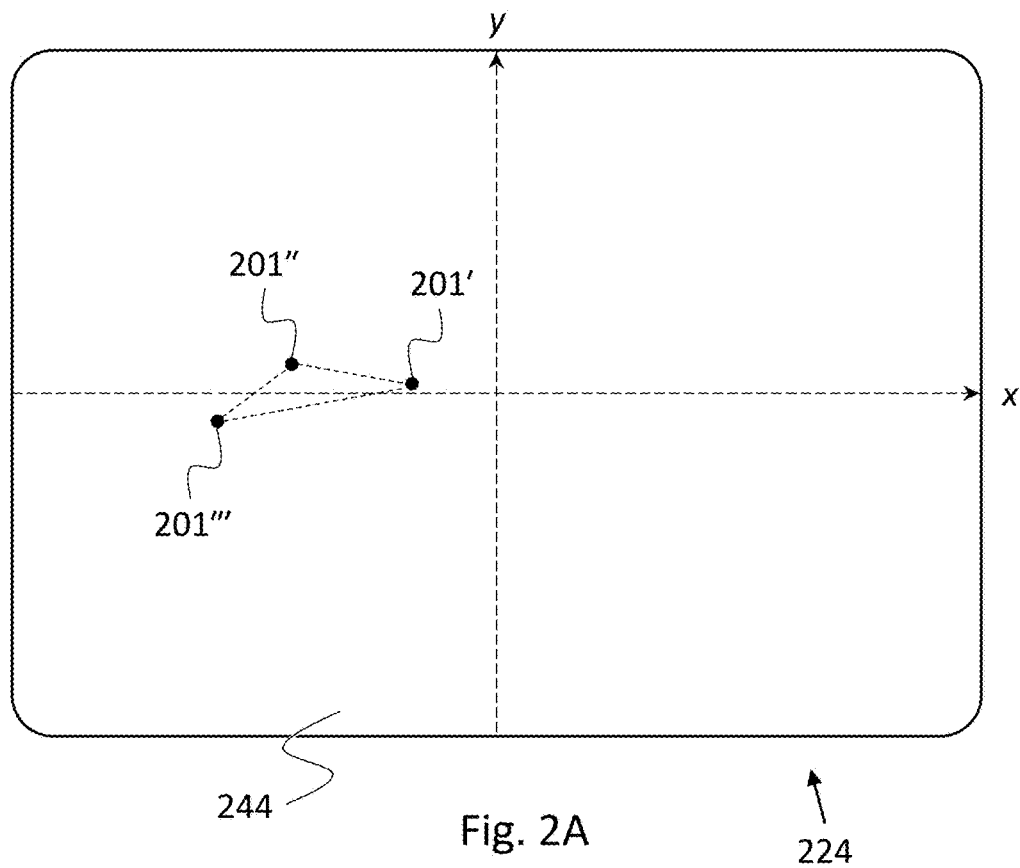
FIG. 2A schematically depicts spots on a photosensitive surface of an image sensor of the system of FIG. 1A, obtained as part of an inspection of a sample, according to some embodiments.
Figure 2B:
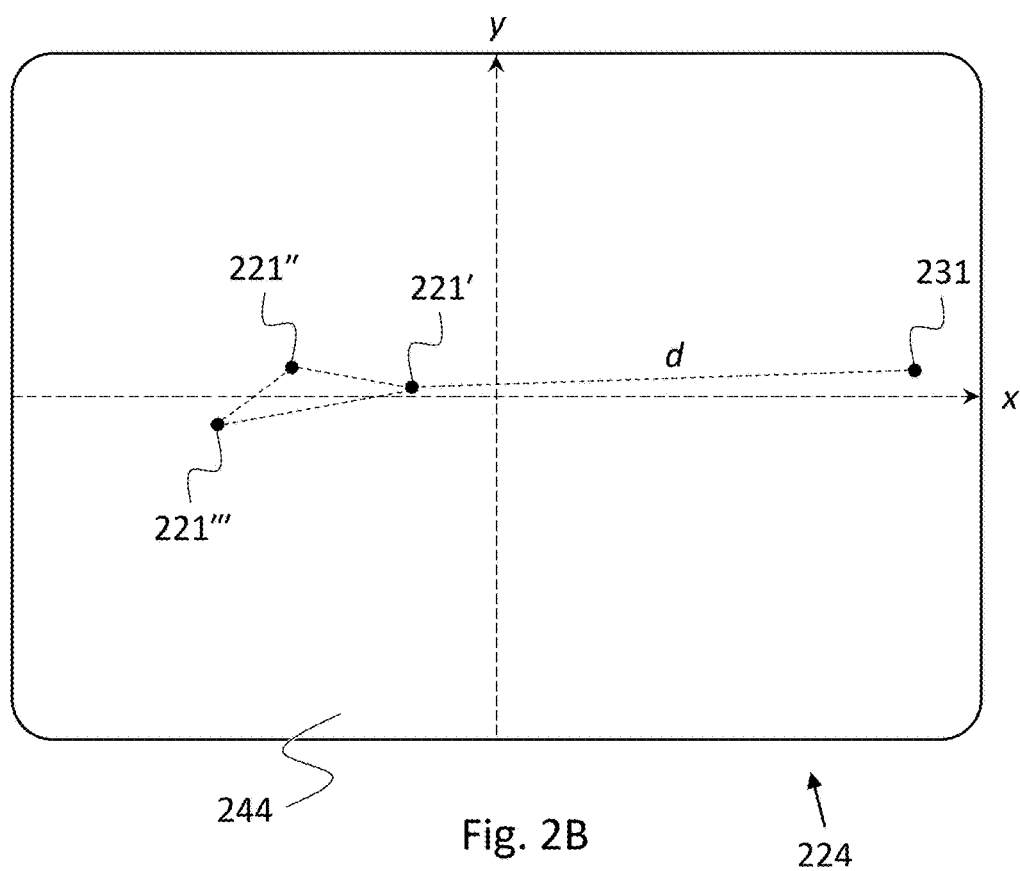
FIG. 2B schematically depicts spots on a photosensitive surface of an image sensor of the system of FIG. 1A, obtained as part of an inspection of a sample, according to some embodiments.

Referring also to FIG. 2A, FIG. 2A schematically depicts spots 201 on a photosensitive surface 244 of an image sensor 224, according to some embodiments of system 100, wherein (i) optical element first surface 134a is coated by an anti-reflective coating, and (ii) ICA 112 includes an autocollimator. The autocollimator includes image sensor 224, which corresponds to specific embodiments of light sensing component 124 or is included therein. Spots 201 include: a first spot 201', a second spot 201", and a third spot 201''', according to some embodiments. Spots 201 are formed by the returned light beams (indicated in FIGS. 1D and 1E by arrows 145). According to some embodiments, it may not be possible to attribute a spot to a specific returned light beam. (Unless each of the internal facets is inspected separately, for example, as described below in the description of FIGS. 3 and 4, or, optionally, if additional information uniquely characterizing each of internal facets is available, for example, if the internal facets differ from one another by design in their reflectivity). In particular, it is to be understood that first spot 201' may be formed by the first returned light beam (induced by reflection off first internal facet 14a), the second returned light beam (induced by reflection off second internal facet 14b), or the third returned light beam (induced by reflection off third internal facet 14c). Similarly, second spot 201" may be formed by any one of the returned light beams (but a different returned light beam than that forming first spot 201'), and third spot 201''' may be formed by any one of the returned light beams (but a different returned light beam than each of that forming first spot 201' and that forming second spot 201"). However, as described by way of example below, information such an average magnitude of deviation (also referred to as the average "radial deviation") from parallelism and a maximum magnitude of deviation (also referred to as the maximum "radial deviation") from parallelism may be extracted from the coordinates of spots 201.

As used herein, the "radial deviation from parallelism" between internal facets generally refers to a quantifier deviation of deviation from parallelism, which takes into account both deviations in pitch and in roll.

The two-dimensional vectors $u_\alpha=(u_{\alpha,x}, u_{\alpha,y})$, $u_\beta=(u_{\beta,x}, u_{\beta,y})$, and $u_\gamma=(u_{\gamma,x}, u_{\gamma,y})$ specify the locations of first spot 201', second spot 201", and third spot 201''', respectively. Noting that spots 201 are spatially extended (i.e. not one-dimensional), according to some embodiments, the vectors $u_\alpha$, $u_\beta$, and $u_\gamma$ may specify (coordinates of) center points of spots 201', second spot 201", and third spot 201''', respectively. According to some embodiments, the center points may be computed by averaging over the coordinates of each pixel making up a spot weighted by the intensity of the pixel.

The unit vector $p_\alpha$ corresponds to the propagation direction of the returned light beam giving rise to first spot 201'. The unit vector $p_\beta$ corresponds to the propagation direction of the returned light beam giving rise to second spot 201". The unit vector $p_\gamma$ corresponds to the propagation direction of the returned light beam giving rise to third spot 201'''. The angular deviation $\delta_{\gamma\beta}$ corresponds to the magnitude of the angle subtended between $p_\gamma$ and $p_\beta$. The angular deviation $\delta_{\gamma\beta}$ corresponds to the magnitude of the angle subtended between $p_\alpha$ and $p_\gamma$. The angular deviation $\delta_{\beta\alpha}$ corresponds to the magnitude of the angle subtended between $p_\beta$ and $p_\alpha$. The angular deviations $\delta_{\gamma\beta}$, $\delta_{\alpha\gamma}$, and $\delta_{\beta\alpha}$ may be inferred from the vectors $u_\alpha$, $u_\beta$, and $u_\gamma$. In turn, from the angular deviations, a (magnitude(s) of) deviation(s) from parallelism between the internal facets may be inferred.

The coordinate system depicted in FIG. 2A is assumed to coincide with the coordinate system depicted in FIG. 1D up to a possible translation of the origin. According to some embodiments, wherein a focusing lens (not shown; e.g. of an autocollimator) of a focal length $f_1$ is used to focus the returned light beams on an image sensor (e.g. of the autocollimator), the magnitudes of the angular deviations between the returned light beams may be computed using the relations $$\tan(\delta_{\gamma\beta}) = \sqrt{(u_\beta - u_\gamma)^2}/f_1, \tan(\delta_{\alpha\gamma}) = \sqrt{(u_\gamma - u_\alpha)^2}/f_1,$$

and $$\tan(\delta_{\beta\alpha}) = \sqrt{(u_\alpha - u_\beta)^2}/f_1.$$

The unit vector $q_\alpha$ corresponds to the normal to the internal facet off which the light beam, giving rise to first spot 201', is reflected. (Thus, most generally, the unit vector $q_\alpha$ may correspond to the normal to first internal facet 14a, second internal facet 14b, or third internal facet 14c). The unit vector $q_\beta$ corresponds to the normal to the internal facet off which the light beam, giving rise to second spot 201", is reflected. The unit vector $q_\gamma$ corresponds to the normal to the internal facet off which the light beam, giving rise to third spot 201''', is reflected. The deviation $\varepsilon_{\gamma\beta}$ corresponds to the magnitude of the angle subtended between $q_\beta$ and $q_\gamma$. The deviation $\varepsilon_{\alpha\gamma}$ corresponds to the magnitude of the angle subtended between $q_\alpha$ and $q_\gamma$. The deviation $\varepsilon_{\beta\alpha}$ corresponds to the magnitude of the angle subtended between $q_\beta$ and $q_\alpha$. As will be apparent to the skilled person (from Snell's law), $n_s \cdot \sin(2\varepsilon_{\gamma\beta}) = \sin(\delta_{\gamma\beta})$, $n_s \cdot \sin(2_{\alpha\gamma}) = \sin(\delta_{\alpha\gamma})$, and $n_s \cdot \sin(2\varepsilon_{\beta\alpha}) = \sin(\delta_{\beta\alpha})$.

The expression $\max\{\varepsilon_{\gamma\beta}, \varepsilon_{\alpha\gamma}, \varepsilon_{\beta\alpha}\}$ may be used to quantify the maximum radial deviation from parallelism. The expression $(\varepsilon_{\gamma\beta} + \varepsilon_{\alpha\gamma} + \varepsilon_{\beta\alpha})/3$ may be used to quantify the average radial deviation from parallelism between the internal facets. Since none of spots 201 will typically be individually attributable to a reflection off a specific internal facet, the above expressions are independent of the signs of the angular deviations.

Similarly (with the depicted choice of coordinate system), the magnitudes of the deviations in pitch between the internal facets (i.e. $\varepsilon_{\gamma\beta,p}$, $\varepsilon_{\alpha\gamma,p}$, and $\varepsilon_{\beta\alpha,p}$) may be computed from the relations $\tan(\delta_{\gamma\beta,p}) = |u_{\beta,x} - u_{\gamma,x}|/f$ and $n_s \cdot \sin(2\varepsilon_{\gamma\beta,p}) = \sin(\delta_{\gamma\beta,p})$, $\tan(\delta_{\alpha\gamma,p}) = |u_{\gamma,x} - u_{\alpha,x}|/f$ and $n_s \cdot \sin(2\varepsilon_{\alpha\gamma,p}) = \sin(\delta_{\alpha\gamma,p})$, and $\tan(\delta_{\beta\alpha,p}) = |u_{\alpha,x} - u_{\beta,x}|/f$ and $n_s \cdot \sin(2\varepsilon_{\beta\alpha,p}) = \sin(\delta_{\beta\alpha,p})$, respectively. The magnitudes of the deviations in roll between the internal facets (i.e. $\varepsilon_{\gamma\beta,r}$, $\varepsilon_{\alpha\gamma,r}$, $\varepsilon_{\beta\alpha,r}$) may be computed from the relations $\tan(\delta_{\gamma\beta,r}) = |_{\beta,y} - u_{\gamma,y}|/f$ and $n_s \cdot \sin(2\varepsilon_{\gamma\beta,r}) = \sin(\delta_{\gamma\beta,r})$, $\tan(\delta_{\alpha\gamma,r}) = |u_{\gamma,y} - u_{\alpha,y}|/f$ and $n_s \cdot \sin(2\varepsilon_{\alpha\gamma,r}) = \sin(\delta_{\alpha\gamma,r})$, and $\tan(\delta_{\beta\alpha,r}) = |u_{\alpha,y} - u_{\beta,y}|/f$ and $n_s \cdot \sin(2\varepsilon_{\beta\alpha,r}) = \sin(\delta_{\beta\alpha,r})$, respectively. $\delta_{\gamma\beta,p}$ and $\delta_{\gamma\beta,r}$ correspond to the magnitudes of the pitch and roll, respectively, between $p_\gamma$ and $p_\beta$. $\delta_{\alpha\gamma,p}$ and $\delta_{\alpha\gamma,r}$ correspond to the magnitudes of the pitch and roll, respectively, between $p_\alpha$ and $p_\gamma$. $\delta_{\beta\alpha,p}$ and $\delta_{\beta\alpha,r}$ correspond to the magnitudes of the pitch and roll, respectively, between $p_\beta$ and $p_\alpha$. The expressions $\max\{\varepsilon_{\gamma\beta,p}, \varepsilon_{\alpha\gamma,p}, \varepsilon_{\beta\alpha,p}\}$ and $\max\{\varepsilon_{\gamma\beta,r}, \varepsilon_{\alpha\gamma,r}, \varepsilon_{\beta\alpha,r}\}$ may be used to quantify the maximum (magnitude of the) deviations in pitch and roll, respectively, between internal facets 14. The expressions $(\varepsilon_{\gamma\beta,p} + \varepsilon_{\alpha\gamma,p} + \varepsilon_{\beta\alpha,p})/3$ and $(\varepsilon_{\gamma\beta,r} + \varepsilon_{\alpha\gamma,r} + \varepsilon_{\beta\alpha,r})/3$ may be used to quantify the average (magnitude of) deviations in pitch and roll, respectively, between internal facets 14.

Alternatively, according to some embodiments, a maximum deviation from parallelism $\varepsilon_{max}$ between internal facets 14 may be quantified using the relations $$\tan(\delta_{max}) = \frac{1}{f}\sqrt{\sum_{k=x,y}\left(\max\{u_{\alpha,k}, u_{\beta,k}, u_{\gamma,k}\} - \min\{u_{\alpha,k}, u_{\beta,k}, u_{\gamma,k}\}\right)^2} \text{ and}$$

$$n_s \cdot \sin(2\varepsilon_{max}) = \sin(\delta_{max}).$$

According to some embodiments, wherein the deviations from parallelism are sufficiently small, small angle approximations may be employed. Under the small angle approximation (when working in radians)

$$\varepsilon_{\gamma\beta} = \sqrt{(u_\beta - u_\gamma)^2}/(2n_s f_1), \varepsilon_{\alpha\gamma} = \sqrt{(u_\gamma - u_\alpha)^2}/(2n_s f_1), \text{ and}$$

$$\varepsilon_{\beta\alpha} = \sqrt{(u_\alpha - u_\beta)^2}/(2n_s f_1).$$

Similarly, $\varepsilon_{\gamma\beta,p} = [u_{\beta,x} - \varepsilon_{\gamma,x}]/(2n_s \cdot f_1)$, $\varepsilon_{\alpha\gamma,p} = |u_{\gamma,x} - u_{\alpha,x}|/(2n_s \cdot f_1)$, and $\varepsilon_{\beta\alpha,p} = |u_{\alpha,x} - u_{\beta,x}|/(2n_s \cdot f_1)$, and $\varepsilon_{\gamma\beta,r} = |u_{\beta,y} - u_{\gamma,y}|/(2n_s \cdot f_1)$, $\varepsilon_{\alpha\gamma,r} = |u_{\gamma,y} - u_{\alpha,y}|/(2n_s \cdot f_1)$, and $\varepsilon_{\beta\alpha,r} = |u_{\alpha,y} - u_{\beta,y}|/(2n_s \cdot f_1)$.

Referring also to FIG. 2B, FIG. 2B schematically depicts spots 221 and a spot 231 on photosensitive surface 244, according to some embodiments of system 100, wherein the incident light beam is projected at a slight tilt relative to the normal to optical element first surface 234a and optical element first surface 134a is not coated by an anti-reflective coating (and ICA 112 includes an autocollimator including an image sensor). Spot 231 is formed by a portion of the incident light beam, which is directly reflected off optical element first surface 134a (i.e. the portion of the incident light beam specularly reflected off optical element first surface 134a).

The two-dimensional vector $v = (v_x, v_y)$ specifies the coordinates of a spot 231 (e.g. the coordinates of the center point of the spot). The two-dimensional vectors $u' = (u_x', u_y')$, $u'' = (u_x'', u_y'')$, and $u''' = (u_x''', u_y''')$ specify the coordinates of spots 221, which include a first spot 221', a second spot 221'', and a third spot 221''' formed by light beams returned from internal facets 214. First spot 221' is the closest of spots 221 to spot 231. d denotes the distance between first spot 221' and spot 231 (i.e. $d = |u' - v|$). According to some embodiments, the incidence angle of the incident light beam on optical element first surface 134a (the angle by which the incident light beam is tilted relative to the normal to optical element first surface 134a) may be selected to ensure that d will be much greater than each of $|u' - v|$, $|u'' - v|$, and $|u''' - v|$, and thereby enabling identification of spot 231 (i.e. the attribution of spot 231 to the portion of the incident light beam directly reflected off optical element first surface 134a).

According to some embodiments, controller 108 may be communicatively associated with a computational module 146. Computational module 146 may include one or more processors and volatile and/or non-volatile memory components. The one or more processors may be configured to receive from controller 108 raw or processed sensed data of light sensing component 124 (i.e. measured data obtained by light sensing component 124), and, based thereon, compute a collective (e.g. average or maximum) deviation from parallelism and/or deviations from parallelism between pairs of internal facets 14. Raw sensed data may include intensities of pixels making up spots formed by returned light beams focused on the light sensing component 124. Processed sensed data may include the angular deviations between (pairs of) the returned light beams or the center points of the spots formed by the returned light beams (e.g. the coordinates of the vectors ua, up, and uy, or the vectors u', u'', and u'''). According to some such embodiments, computational module 146 may be configured to process raw sensed data of light sensing component 124 to obtain therefrom the angular deviations between (pairs of) the returned light beams.

According to some embodiments, the one or more processors may include a graphics processing unit (GPU) configured to execute image recognition software in order to identify spots 201 (or spots 221 and 231). According to some embodiments, for example, embodiments wherein optical element first surface 134a is not coated by a reflective coating, the image recognition software may further be configured to distinguish the spot (e.g. spot 231) formed by a light beam directly reflected off optical element first surface 134a from spots (e.g. spots 221) formed by returned light beams, which underwent reflection off internal facets 14.

According to some embodiments, computational module 146 may be included in system 100.

According to some alternative embodiments, not depicted in the Figures, instead of optical setup 104, system 100 may include an interferometric setup, and information, including radial deviations from parallelism between pairs of internal facets 14, may be extracted from interference patterns formed by the returned light beams. According to some such embodiments, the interferometric setup may include an array of beam splitters and an associated array of controllably openable and closeable blocking filters configured to allow inspecting pairs of internal facets one at time. More specifically, the beam splitters and blocking filters arrays may be configured (i) split an incident beam into a selectable pair of incident sub-beams normally incident on optical element 102, and (ii) recombine two returned sub-beams—induced by the pair of incident light beams, respectively—into a single combined returned light beam, which is then sensed by an image sensor. The beam splitters and the blocking filters arrays are configured such that each selectable pair of incident sub-beams will induce reflection off a respective pair of internal facets with a first incident sub-beam probing one of the internal facets and the second incident sub-beam probing another internal facet. For example, a first incident sub-beam will induce reflection off an i-th internal facet (following transmission into optical element 102, passage therethrough, and transmission into sample 10), and a second incident sub-beam will induce reflection off a j-th internal facet (following transmission into optical element 102, passage therethrough, and transmission into sample 10), wherein i and j are controllably selectable. As the skilled person will readily recognize, the radial deviation from parallelism of between the i-th and j-th internal facet may be extracted from the interference pattern formed thereby on the light sensor.

Figure 3:
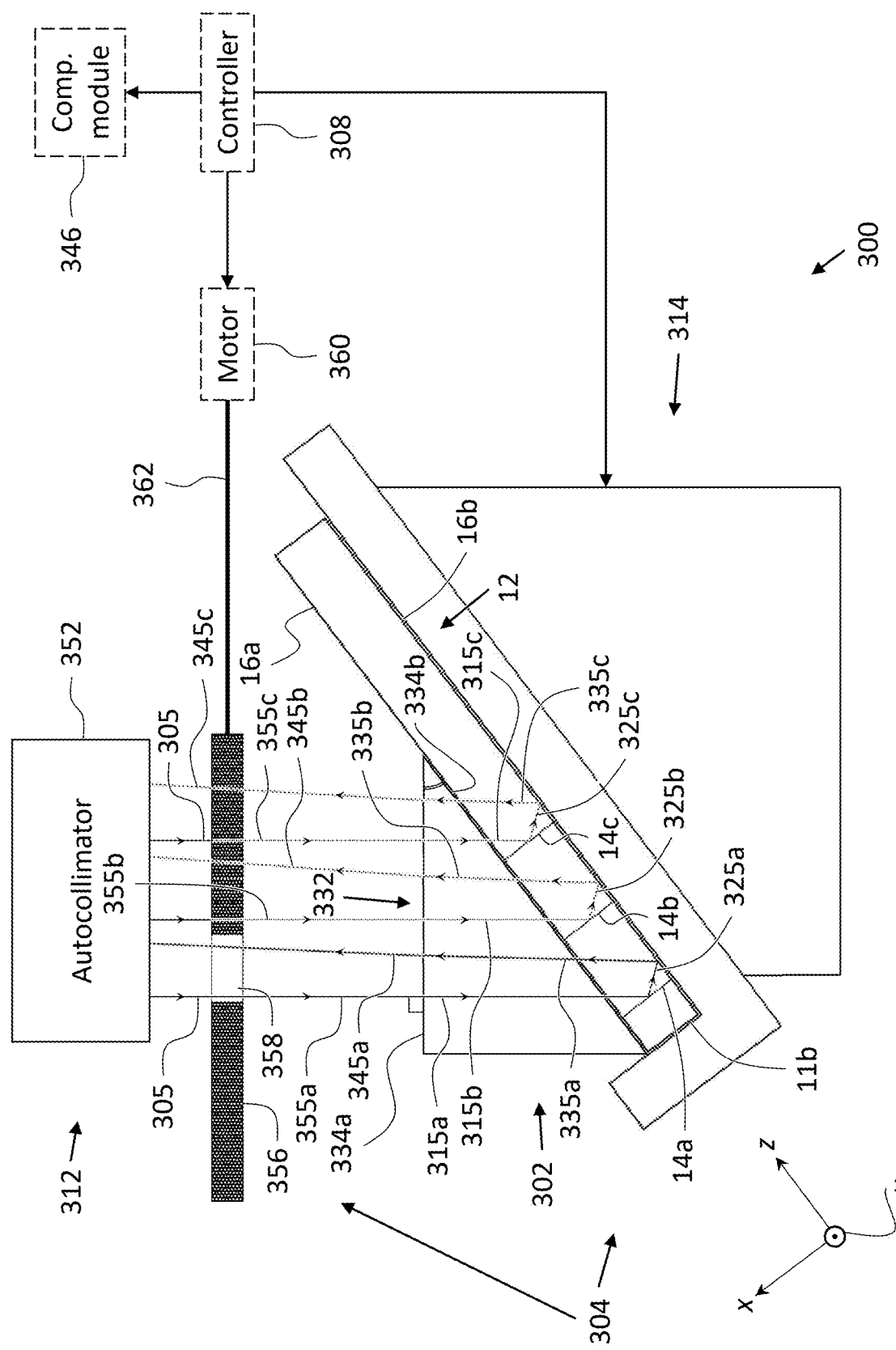
FIG. 3 schematically depicts an optical-based system for metrology of internal facets of samples, which corresponds to specific embodiments of the system of FIG. 1A.

According to some embodiments, each of internal facets 14 may be inspected (probed) one at a time, e.g. using a translatable slitted or apertured optical mask or a shutter assembly. FIG. 3 schematically an optical-based system 300, which corresponds to specific embodiments of system 100, and which is configured for validating parallelism between internal facets of a sample by inspecting the internal facets one at a time. More specifically, FIG. 3 presents a cross-sectional sideview of system 300 and sample 10, according to some embodiments. (It is to be understood that sample 10 does not constitute a part of system 300.)

System 300 includes a light transmissive optical element 302, an optical setup 304, and, optionally, a controller 308, which correspond to specific embodiments of optical element 102, optical setup 104, and controller 108, respectively. Optical element 302 includes a substrate 332, an optical element first surface 334a, and an optical element second surface 334b, which correspond to specific embodiments of substrate 132, optical element first surface 134a, and optical element second surface 134b, respectively.

Optical setup 304 includes an ICA 312 and an orientable holding infrastructure 314, which correspond to specific embodiments of ICA 112 and holding infrastructure 114, respectively. ICA 312 includes an autocollimator 352 including an image sensor (not shown). According to some embodiments, autocollimator 352 is a digital autocollimator or an electronic autocollimator. According to some embodiments, autocollimator 352 is a laser autocollimator. According to some embodiments, ICA 312 may further include an optical mask 356 including a slit 358. According to some embodiments, optical mask 356 may be translatable, so as to allow controllably positioning slit 358 above any one of internal facets 14, and thereby allow inspecting each of internal facets 14 one at a time. According to some such embodiments, optical setup 304 may further include a motor 360, which may be mechanically associated with optical mask 356, so as to allow translating optical mask 356. According to some embodiments, motor 360 may be a linear stepper motor, which may be mechanically coupled to optical mask 356 via a screw 362.

Also indicated is a computational module 346, which corresponds to specific embodiments of computational module 146. According to some embodiments, computational module 346 may be included in system 300.

According to some alternative embodiments, not depicted in FIG. 3, instead of optical mask 356 (and motor 360), ICA 312 may include a shutter assembly, including a plurality of individually openable and closeable shutters. Each shutter may be positioned above a respective internal facet, thereby allowing to inspect each of internal facets 14 one at a time.

In operation, according to some embodiments, optical mask 356 is translated, so as to position slit 358 over each of internal facets 14 one after the other. For example, and as depicted in FIG. 3, when slit 358 is positioned over first internal facet 14a, a collimated light beam, indicated by arrows 305 (not all of which are numbered), is projected on optical mask 356 in a direction, perpendicular to optical element first surface 334a. A (first) incident portion of the collimated light beam passes through slit 358, normally impinges on optical element first surface 334a, and is transmitted therethrough into optical element 302, thereby obtaining a transmitted light beam. The first incident portion is indicated by an arrow 355a and the transmitted light beam is indicated by an arrow 315a. The transmitted light beam travels across optical element 302, crosses into sample 10 via optical element second surface 334b and sample first surface 16a and propagates towards first internal facet 14a. The transmitted light beam is reflected off first internal facet 14a towards sample second surface 16b. A first reflected light beam—corresponding to the portion of the transmitted light beam reflected off first internal facet 14a—is indicated by an arrow 325a. A first doubly-reflected light beam is obtained by reflection of the first reflected light beam off sample second surface 16b towards sample first surface 16a. The first doubly-reflected light beam is indicated by an arrow 335a. The first doubly-reflected (i.e. twice reflected: once off first internal facet 14a, and then off sample second surface 16b) light beam exits sample 10 into optical element 302 via sample first surface 16a and optical element second surface 334b. The first doubly-reflected light beam travels to optical element first surface 334a and exits (e.g. is refracted out of) optical element 302, thereby obtaining a first returned light beam. The first returned light beam is indicated by an arrow 345a. The first returned light beam travels to autocollimator 352, after passing through slit 358, and is sensed by the image sensor of autocollimator 352.

A trajectory of a second incident portion, a second transmitted light beam, a second reflected light beam, a second doubly-reflected light beam, and a second returned light beam is indicated by dotted arrows 355b, 315b, 325b, 335b, and 345b, respectively. This trajectory will be realized when optical mask 356 is translated such that slit 358 is positioned over second internal facet 14b. Arrows 355b, 315b, 325b, 335b, and 345b are rendered by a dotted line to indicate this trajectory is not realized when slit 358 is positioned over first internal facet 14a (i.e. the corresponding light beams are not present when slit 358 is positioned over first internal facet 14a). A trajectory of a third incident portion, a third transmitted light beam, a third reflected light beam, a third doubly-reflected light beam, and a third returned light beam is indicated by dotted arrows 355c, 315c, 325c, 335c, and 345c, respectively. This trajectory will be realized when optical mask 356 is translated such that slit 358 is positioned over third internal facet 14c. Arrows 355c, 315c, 325c, 335c, and 345c are rendered by a dotted line to indicate this trajectory is not realized when slit 358 is positioned over first internal facet 14a (i.e. the corresponding light beams are not present when slit 358 is positioned over first internal facet 14a).

According to some embodiments, optical mask 356 may be translated continuously. As a transmitted light is scanned along an internal facet, the respective spot formed on the image sensor of autocollimator 352 remains essentially fixed (unless the internal facet is bent, curved, and/or otherwise deformed). As the transmitted light beam transitions onto an adjacent internal facet, a new spot is formed on the image sensor (when the two internal facets are sufficiently misaligned). Once the transition is completed, only the new spot remains on the image sensor.

According to some alternative embodiments, optical mask 356 may be shifted between distinct locations in a plurality of locations. In each of the locations slit 358 is positioned over one of internal facets 14, respectively. Collimated light beam 305 may be projected only when optical mask 356 is in one of the (distinct) locations.

In order not to encumber FIG. 3, light beams reflected off optical element first surface 334a are not shown.

Figure 4:
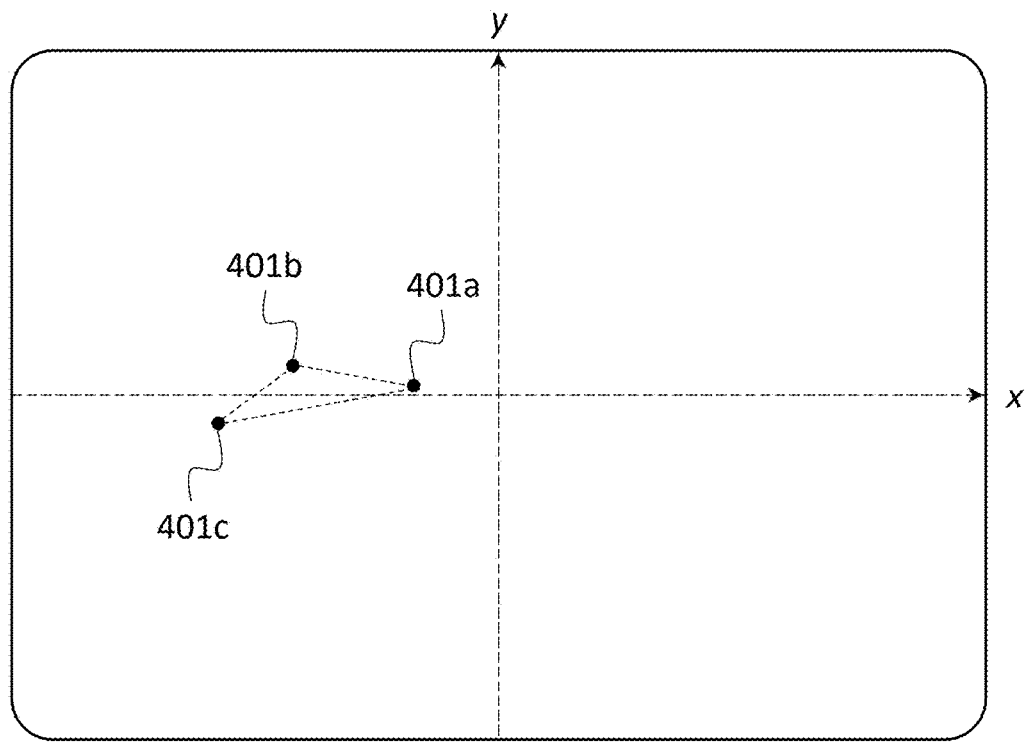
FIG. 4 schematically depicts spots on a photosensitive surface of an image sensor of the system of FIG. 3, obtained as part of an inspection of a sample, according to some embodiments.

Referring also to FIG. 4, FIG. 4 schematically depicts spots 401 on a digital display 464 of autocollimator 352, according to some embodiments of system 300, wherein optical element first surface 334a is coated by an anti-reflective coating. Spots 401 include: a first spot 401a, a second spot 401b, and a third spot 401c, according to some embodiments. Since internal facets 14 are inspected one at a time, it is known which of the returned light beams gave rise to each of spots 401, and therefore which of internal facets 14 gave rise to each of spots 401. Accordingly, deviations from parallelism between each pair of internal facets 14 may be computed. First spot 401a is formed by the first returned light beam (indicated in FIG. 3 by arrow 345a). Second spot 401b is formed by the second returned light beam (indicated in FIG. 3 by arrow 345b). Third spot 401c is formed by the third returned light beam (indicated in FIG. 3 by arrow 345c).

The two-dimensional vectors $u_1=(u_{1, x}, u_{1, y})$, $u_2=(u_{2, x}, u_{2, y})$, and $u_3=(u_{3, x}, u_{3, y})$ specify the coordinates (e.g. center points) of first spot 401a, second spot 401b, and third spot 401c, respectively. Deviations in pitch, as well as in roll, between each of pair of internal facets 14 may be computed from (the values of the components of) $u_1$, $u_2$, and $u_3$.

According to some embodiments, wherein a focusing lens (not shown; e.g. of an autocollimator) of a focal length $f_2$ is used to focus the returned light beams on an image sensor (e.g. of the autocollimator), with a suitable choice of coordinate system, deviations in pitch $\delta_{21, p}$ and in roll $\delta_{21, r}$ of the second returned light beam relative to the first returned light beam may be computed via $\tan(\delta_{21, p})=(u_{2, x}-u_{1, x})/f_2$ and $\tan(\delta_{21, r})=(u_{2, y}-u_{1, y})/f_2$, respectively. Similarly, deviations in pitch $\delta_{31, p}$ and in roll $\delta_{31, r}$ of the third returned light beam relative to the first returned light beam may be computed via $\tan(\delta_{31, p})=(u_{3, x}-u_{1, x})/f_2$ and $\tan(\delta_{31, r})=(u_{3, y}-u_{1, y})/f_2$, respectively, and deviations in pitch $\delta_{32, p}$ and in roll $\delta_{32, r}$ of the third returned beam relative to the second returned beam may be computed via $\tan(\delta_{32, p})=(u_{3, x}-u_{2, x})/f_2$ and $\tan(\delta_{32, r})=(u_{3, y}-u_{2, y})/f_2$, respectively. Accordingly, the deviations from parallelism in pitch $\varepsilon_{21, p}$ and in roll $\varepsilon_{21, r}$ of second internal facet 14b relative to first internal facet 14a may be computed using the relations $n_s\cdot\sin(2\varepsilon_{21, p})=\sin(\delta_{21, p})$ and $n_s\cdot\sin(2\varepsilon_{21, r})=\sin(\delta_{21, r})$, respectively. The deviations from parallelism in pitch $\varepsilon_{31, p}$ and in roll $\varepsilon_{31, r}$ of third internal facet 14c relative to first internal facet 14a may be computed using $n_s\cdot\sin(2\varepsilon_{31, p})=\sin(\delta_{31, p})$ and $n_s\cdot\sin(2\varepsilon_{31, r})=\sin(\delta_{31, r})$, respectively. The deviations from parallelism in pitch $\delta_{32, p}$ and in roll $\delta_{32, r}$ of third internal facet 14c relative to second internal facet 14b may be computed using $n_s\cdot\sin(2\varepsilon_{32, p})=\sin(\delta_{32, p})$ and $n_s\cdot\sin(2\varepsilon_{32, r})=\sin(\delta_{32, r})$, respectively.

The magnitudes of the deviations (i.e. the radial deviations) from parallelism of second internal facet 14b relative to first internal facet 14a, third internal facet 14c relative to first internal facet 14a, and third internal facet 14c relative to second internal facet 14b can be computed using the relations tan $$\tan(\delta_{21}) = \sqrt{(u_2-u_1)^2}/f_2$$

and $n_s\cdot\sin(2\varepsilon_{21})=\sin(\delta_{21})$, $$\tan(\delta_{31}) = \sqrt{(u_3-u_1)^2}/f_2$$

and $n_s\cdot\sin(2\varepsilon_{31})=\sin(\delta_{31})$, and tan $$\tan(\delta_{32}) = \sqrt{(u_3-u_2)^2}/f_2$$

and $n_s\cdot\sin(2\varepsilon_{32})=\sin(\delta_{32})$, respectively.

According to some embodiments, wherein the deviations from parallelism are sufficiently small, small angle approximations may be employed. As will be apparent to the skilled person, under the small angle approximation (when working in radians) $\varepsilon_{21, p}=(u_{2, x}-u_{1, x})/(2 n_s\cdot f_2)$ and $\varepsilon_{21, r}=(u_{2, y}-u_{1, y})/(2n_s\cdot f_2)$, $\varepsilon_{31, p}=(u_{3, x}-u_{2, x})/(2n_s\cdot f_2)$ and $\varepsilon_{31, r}=(u_{3, y}-u_{1, y})/(2n_s\cdot f_2)$, and $\varepsilon_{32, p}=(u_{3, x}-u_{2, x})/(2n_s\cdot f_2)$ and $\varepsilon_{32, r}=(u_{3, y}-u_{2, y})/(2n_s\cdot f_2)$.

According to some embodiments, computational module 346 may be configured to compute the deviations from parallelism between some or all pairs of internal facets in an inspected sample. According to some embodiments, particularly embodiments wherein the number of internal facets is large, computational module 346 may be configured to compute the deviations from parallelism between all pairs of adjacent internal facets in an inspected sample. According to some such embodiments, computational module 346 may be configured to compute the deviations from parallelism of one of the internal facets (e.g. a first most or endmost internal facet) relative to all other facets. According to some embodiments, computational module 346 may be further configured to additionally compute the uncertainties in the computed deviations from parallelism.

Figure 5:
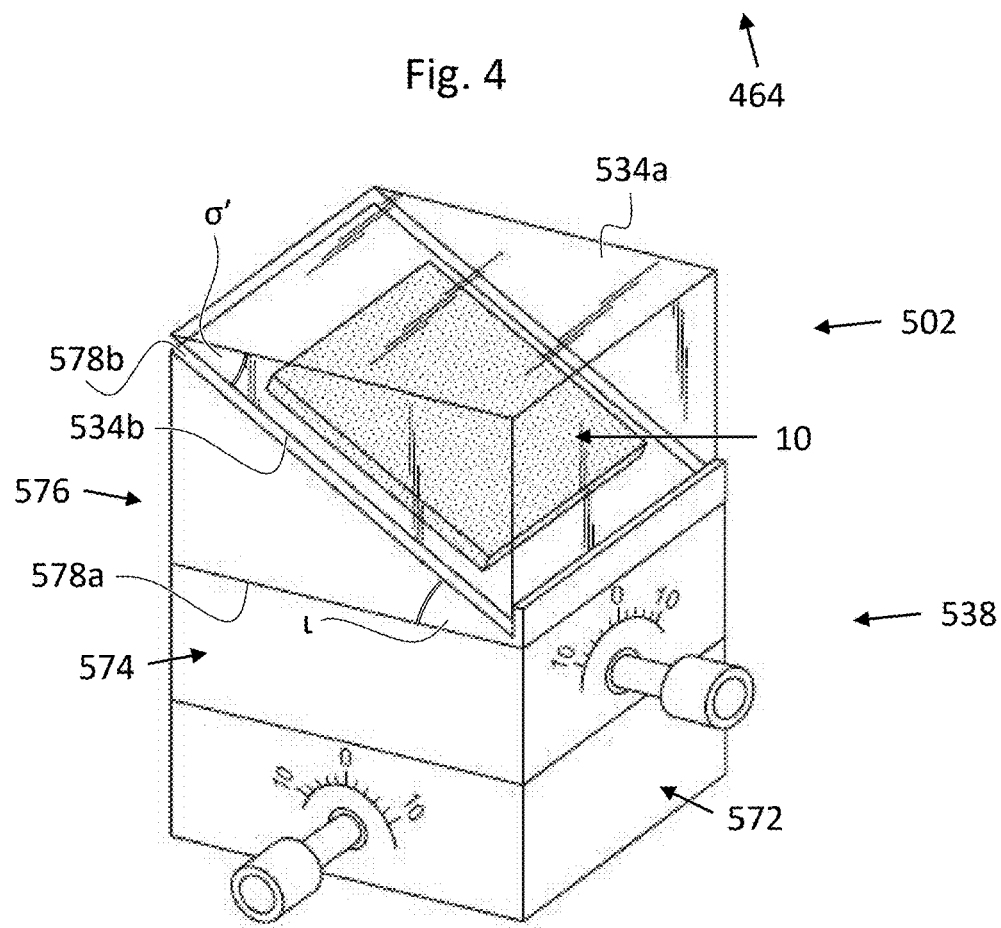
FIG. 5 schematically depicts some components of an optical-based system for metrology of internal facets of samples, which corresponds to specific embodiments of the system of FIG. 1A, with a sample mounted thereon.

FIG. 5 schematically depicts a stage assembly 538 with sample 10 disposed thereon, according to some embodiments. Also depicted is an optical element 502, which is disposed on sample 10. Stage assembly 538 and optical element 502 correspond to specific embodiments of stage assembly 138 and optical element 102 of system 100. An optical element second surface 534b is inclined relative to an optical element first surface 534a at an inclination angle σ'. Optical element first surface 534a and optical element second surface 534b correspond to specific embodiments of optical element first surface 134a and optical element second surface 134b, respectively.

Stage assembly 538 includes a pitch goniometer 572, a roll goniometer 574, and an inclined platform 576. According to some embodiments, and as depicted in FIG. 5, inclined platform 576 is mounted on roll goniometer 574, which is mounted on pitch goniometer 572. Inclined platform 576 includes an external and flat platform top surface 578a and an external and flat platform base surface 578b opposite to platform top surface 578a. According to some embodiments, platform top surface 578a is inclined relative to base surface 578b at a platform inclination angle t about equal to σ'.

The orientation of inclined platform 576, and therefore the orientation of sample 10 and optical element 502 may be adjusted by orienting pitch goniometer 572 and roll goniometer 574, thereby allowing to controllably set the incidence angle of a light beam projected on optical element 502, e.g. by an ICA (not shown). According to some embodiments, each of pitch goniometer 572 and roll goniometer 574 may be oriented using a programmable micrometer (not shown). Additionally, or alternatively, according to some embodiments, each of pitch goniometer 572 and roll goniometer 574 may be manually orientable.

Figure 6A:
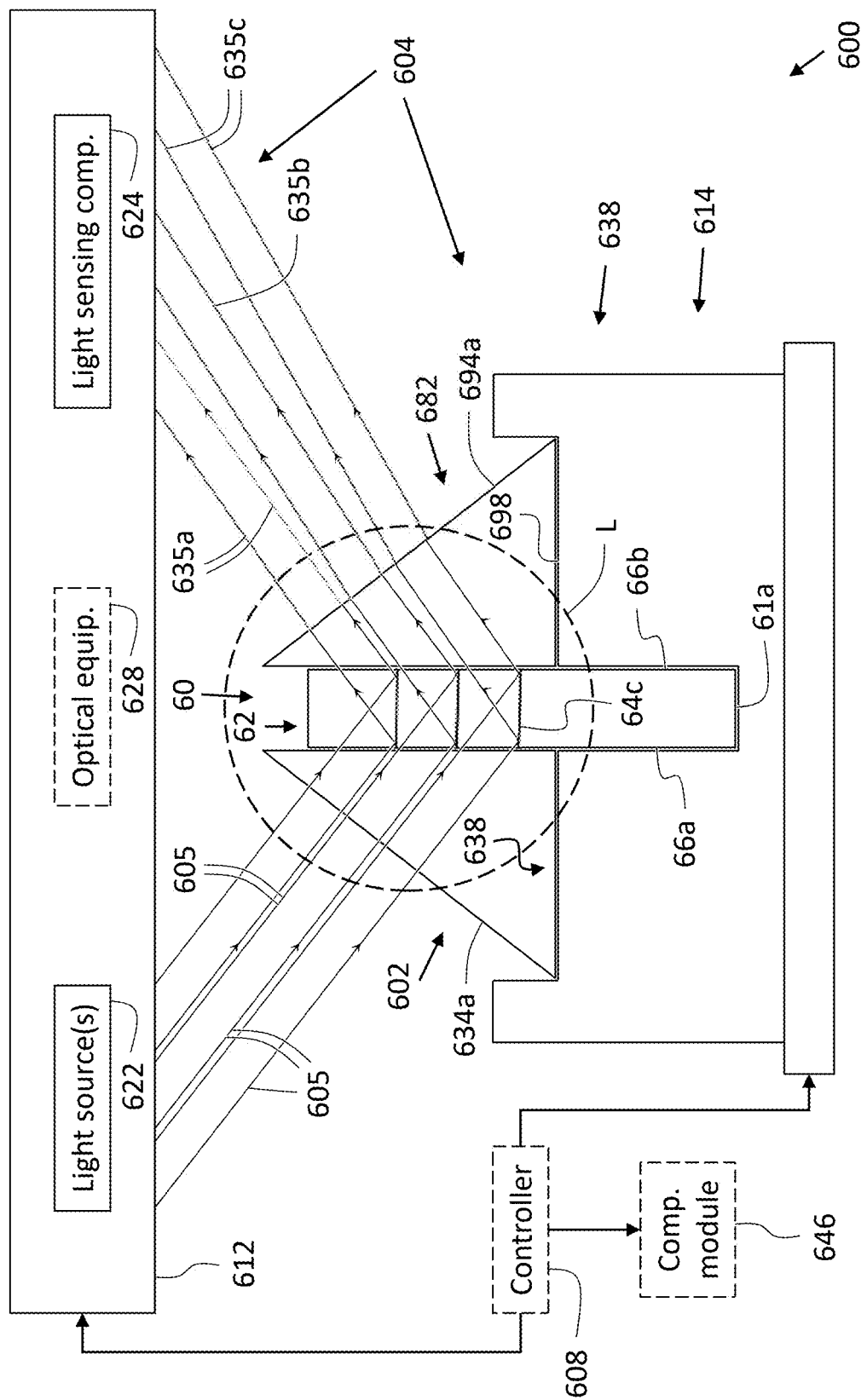
FIG. 6A schematically depicts an optical-based system for metrology of internal facets of samples and a sample mounted thereon, according to some embodiments.
Figure 6B:
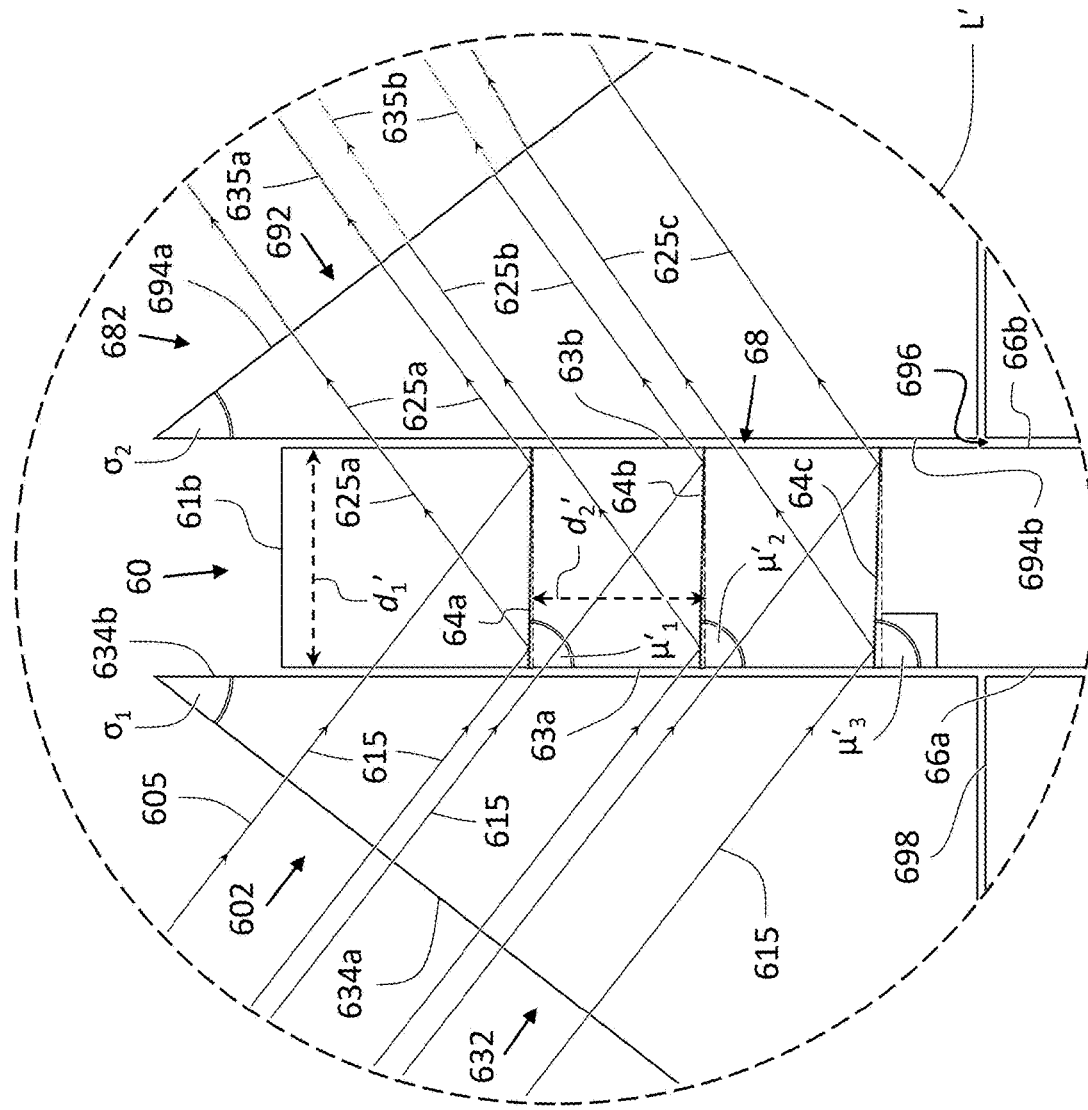
FIG. 6B is an enlarged cross-sectional view of a section of the sample of FIG. 6A, according to some embodiments.

FIGS. 6A and 6B schematically depict an optical-based system 600 for metrology of internal facets in samples, according to some embodiments FIG. 6B is an enlarged view of a part of FIG. 6A delineated by a dashed line L'. Optical-based system 600 is configured for validating parallelism between internal facets of a sample. More specifically, FIG. 6A presents a cross-sectional sideview of system 600 and a sample 60 with sample 60 undergoing inspection by system 600, according to some embodiments. (It is to be understood that sample 60 does not constitute a part of system 600.)

Sample 60 includes a substrate 62, which is light transmissive, and two or more internal facets 64, which are embedded in substrate 62. Substrate 62 may be characterized by a refractive index $n_s'$. Sample 60 further and includes an external first surface 66a (also referred to as "sample first surface") and an external second surface 66b (also referred to as "sample second surface"). Sample second surface 66b is opposite to sample first surface 66a. Each of sample first surface 66a and sample second surface 66b may be flat. According to some embodiments, and as depicted in FIGS. 6A and 6B, sample second surface 66b is parallel to sample first surface 66a. According to some embodiments, each of internal facets 64 constitutes a thin semi-reflective or reflective layer, which is embedded within substrate 62. According to some embodiments, sample 60 may be a one-dimensional or a two-dimensional reflective waveguide. According to some such embodiments, sample first surface 66a and sample second surface 66b constitute major surfaces of the waveguide.

Sample 60 may be similar to sample 10 but, according to some embodiments, may differ therefrom in internal dimensions (or at least proportions) thereof, particularly, in the ratio of $d_1'/d_2'$ to $d_1/d_2$, as elaborated on below, as well as in the refractive index thereof. Here $d_1'$ is the distance between sample first surface 66a and sample second surface 66b, and $d_2'$ is the distance between adjacent internal facets (e.g. internal facets 64a and 64b, internal facets 64b and 64c). $d_1'$ and $d_2'$ are indicated in FIG. 6B.

A sample section 68 of sample 60 corresponds to the part (e.g. segment) of substrate 62 in which internal facets 64 are located (while the section of sample 60, which is complementary to sample section 68 may be devoid of any of internal facets 64). As a non-limiting example, intended to facilitate the description by making it more concrete, in FIGS. 6A and 6B internal facets 64 are shown as including three internal facets: a first internal facet 64a, a second internal facet 64b, and a third internal facet 64c with second internal facet 64b being disposed between first internal facet 64a and third internal facet 64c. The skilled person will readily recognize that the three-internal facet case encompasses the essentials any number of internal facets (e.g. 4, 5, 10, or more).

Internal facets 64 are nominally parallel. In actuality, due to fabrication imperfections, internal facets 64 may typically not exhibit perfect parallelism. According to some embodiments, each of internal facets 64 is nominally inclined relative to sample first surface 66a at a nominal angle $\mu'_{nom}$ (spanned on a plane parallel to the zx plane), which is about equal to 90°. According to some such embodiments, and as depicted in FIGS. 6A and 6B, internal facets 64 are nominally perpendicular to sample first surface 66a (and sample second surface 66b in embodiments wherein sample second surface 66b is parallel to sample first surface 66a), i.e. $\mu'_{nom}=90°$. In actuality, each of internal facets 64 may be oriented at a respective actual angle, which slightly differs from the nominal angle $\mu'_{nom}$. First internal facet 64a, second internal facet 64b, and third internal facet 64c are oriented at a first angle $\mu'_1$, a second angle $\mu'_2$, and a third angle $\mu'_3$, respectively, relative to sample first surface 66a.

It is noted that due to fabrication imperfections, the actual angles $\mu'_i$, (i=1, 2, 3) may differ from one another, and/or the nominal angle $\mu'_{nom}$, not only in magnitude but also by the respectively subtending planes, as explained above for sample 10.

Each of sample first surface 66a and sample second surface 66b extends from first end 61a to second end 61b of sample 60. Sample section 68 defines a first area 63a and a second area 63b on sample first surface 66a and sample second surface 66b, respectively, with internal facets 64 being positioned between first area 63a and second area 63b.

According to some embodiments, system 600 includes a first optical element (FOE) 602, a second optical element (SOE) 682, and an optical setup 604. Each of FOE 602 and SOE 682 are light transmissive. System 600 may further include a controller 608 functionally associated with optical setup 604 and configured to control operation thereof, essentially as described with respect to controller 108 and optical setup 104 of system 100. According to some embodiments, and as depicted in FIG. 6A, optical setup 604 includes an illumination and collection assembly (ICA) 612 and a holding infrastructure 614 for mounting thereon sample 60. According to some embodiments, holding infrastructure 614 may include orienting infrastructure configured to allow controllably setting an orientation of sample 60. ICA 612 includes a light source 622 (or a plurality of light sources) and a light sensing component 624, which may be similar to light source 122 and light sensing component 124, respectively, of system 100. According to some embodiments, light sensing component 624 may be a camera. According to some embodiments, ICA 612 may further include optical equipment 628 whose function may be similar to that of optical equipment 128 of system 100.

FOE 602 includes a substrate 632, which constitutes the bulk of FOE 602 and which is made of a material having about the same refractive index (e.g. greater than $n_s'-0.02$ and smaller than $n_s'+0.02$) as substrate 62. According to some such embodiments, substrate 632 is made of a material having the same refractive index as substrate 62. FOE 602 further includes an external first surface 634a and, opposite thereto, an external second surface 634b. According to some embodiments, and as depicted in FIG. 6A, FOE first surface 634a is flat. According to some such embodiments, and as depicted in FIG. 6A, FOE second surface 634b is also flat and inclined with respect to FOE first surface 634a. According to some embodiments, FOE 602 is a prism. According to some such embodiments, the prism may be a triangular prism.

SOE 682 includes a substrate 692, which constitutes the bulk of SOE 682 and which is made of a material having about the same refractive index (e.g. greater than $n_s'-0.02$ and smaller than $n_s'+0.02$) as substrate 62. According to some such embodiments, substrate 692 is made of a material having the same refractive index as sample 60. SOE 682 further includes an external first surface 694a and, opposite thereto, an external second surface 694b. According to some embodiments, and as depicted in FIG. 6A, SOE first surface 694a is flat. According to some such embodiments, and as depicted in FIG. 6A, SOE second surface 694b is also flat and inclined with respect to SOE first surface 694a. According to some embodiments, SOE 682 is a prism. According to some such embodiments, the prism may be a triangular prism. According to some embodiments, SOE 682 is of the same dimensions, or at least proportions, as FOE 602.

According to some embodiments, FOE second surface 634b and SOE second surface 694b may be inclined relative to FOE first surface 634a and SOE first surface 694a, respectively, at a first inclination angle $\sigma_1$ (which is subtended in parallel to the zx) and a second inclination angle $\sigma_2$ (which is subtended in parallel to the zx), respectively. According to some embodiments, $\sigma_2$ is about equal to $\sigma_1$. $\sigma_1$ and $\sigma_2$ are indicated in FIG. 6B.

According to some embodiments, particularly embodiments wherein (i) sample first surface 66a and sample second surface 66b are parallel, (ii) internal facets 64 are nominally perpendicular to each of sample first surface 66a and sample second surface 66b, and (iii) adjacent internal facets are spaced at regular intervals, each of $\sigma_1$ and $\sigma_2$ may be equal to $(90°-\arctan(d_1'/d_2'))$, that is, 90 degrees minus $\arctan(d_1/d_2)$. The reason for the above choice of inclination angle is explained below.

ICA 612 is configured to output a collimated light beam, which is produced by light source 622, and, optionally, manipulated (e.g. collimated) by optical equipment 628 (in embodiments including optical equipment 628). According to some embodiments, optical equipment 628 may include a collimating lens or a collimating lens assembly (not shown). FOE 602 and ICA 612 (more precisely, illumination components of ICA 612) relative orientation may be (controllably) set such that the light beam output by ICA 612 impinges on FOE first surface 634a normally, or at least about normally (e.g. to within 1°, 1.5°, or even 2° from normal incidence), to FOE first surface 634a.

According to some embodiments, optical equipment 628 may further include a translatable slitted or apertured optical mask (not shown; such as the translatable slitted optical mask of FIG. 7) configured to control an impinging (i.e. striking) location of a light beam (e.g. a laser beam) on FOE first surface 634a, thereby allowing to separately inspect each of internal facets 64. Alternatively, according to some embodiments, optical equipment 628 may further include a plurality of shutters configured to allow (enable) separate inspection of each of internal facets 64.

According to some embodiments, holding infrastructure 614 may be configured to mount or hold sample 60 between FOE 602 and SOE 682, such that each of FOE 602 and SOE 682 is adjacent to sample 60. More specifically, according to some such embodiments, sample 60 and FOE 602 relative positioning may be such that FOE second surface 634b is adjacent and, optionally, parallel to sample first surface 66a, and sample 60 and SOE 682 relative positioning may be such that SOE second surface 694b is adjacent and, optionally, parallel to sample second surface 66b.

According to some embodiments, holding infrastructure 614 may include a platform 638 including a slot (or hole) 696 extending into platform 638 from a top surface 698 of platform 638. Slot 696 is configured to receive thereinto sample 60, such that sample section 68 projects out of slot 696. Platform 638 is further configured for mounting thereon of FOE 602 and SOE 682 with FOE first surface 634a being adjacent and parallel to first area 63a and SOE second surface 694b being adjacent and parallel to second area 63b.

According to some embodiments, platform 638 may be maneuverable in six degrees of freedom.

In operation, according to some embodiments, an expanded and collimated incident light beam, indicated by arrows 605 (not all of which are numbered), is projected on FOE first surface 634a about normally thereto. According to some embodiments, the incident light beam may be projected normally to FOE first surface 634a.

The incident light beam (or at least a portion thereof) is transmitted into FOE 602 via (i.e. through) FOE first surface 634a, thereby obtaining a transmitted light beam. The transmitted light beam is indicated by arrows 615 (not all of which are numbered). The transmitted light beam travels across FOE 602, crosses (i.e. is transmitted into) into sample 60 via FOE second surface 634b and sample first surface 66a, and propagates towards internal facets 64. The transmitted light beam is reflected off internal facets 64 towards sample second surface 66b.

More specifically, since internal facets 64 may slightly differ from one another in the respective orientations thereof, the transmitted light beam may be reflected at slightly different angles off each of internal facets 64, respectively. Accordingly, a plurality of reflected light beams may be obtained, which slightly differ in the respective propagation directions thereof. A first reflected light beam—corresponding to the portion of the transmitted light beam reflected off first internal facet 64a—is indicated by an arrow 625a. A second reflected light beam—corresponding to the portion of the transmitted light beam reflected off second internal facet 64b—is indicated by an arrow 625b. A third reflected light beam—corresponding to the portion of the transmitted light beam reflected off third internal facet 64c—is indicated by an arrow 625c.

The reflected light beams exit sample 60 via sample second surface 66b, and enter SOE 682 via SOE second surface 694b. The reflected light beams next travel to SOE first surface 694a and exit (e.g. are refracted out of) SOE 682, thereby obtaining a (second) plurality of light beams (also referred to as "exiting light beams"): A first exiting light beam—resulting from the refraction of the first reflected light beam out of SOE 682—is indicated by an arrow 635a. A second exiting light beam—resulting from the refraction of the second reflected light beam out of SOE 682—is indicated by an arrow 635b. A third exiting light beam—resulting from the refraction of the third reflected light beam out of SOE 682—is indicated by an arrow 635c. The exiting light beams propagate towards ICA 612, are focused by optical equipment 628 on light sensing component 624, and sensed thereby (e.g. by an image sensor included in light sensing component 624).

According to some embodiments, each of $\sigma_1$ and $\sigma_2$ is equal to $(90°-\arctan(d_1'/d_2'))$. As is apparent by perusing FIGS. 6A and 6B, the above choice of $\sigma_1$ and $\sigma_2$ may ensure that substantially every light ray in the reflected light beams (or at least a portion thereof) exits sample 60 via sample second surface 66b and is transmitted into SOE 682 without being reflected again by any of internal facets 14 or sample first surface 66a. Accordingly, the above choice of $\sigma_1$ and $\sigma_2$ may reduce losses and thereby improve detection of the returned light beams (e.g. by ensuring that the returned light beams form bright spots on a photosensitive surface of the image sensor). According to some embodiments, $\sigma_1$ and $\sigma_2$ may each be equal to about ($90°-\arctan(d_1'/d_2')$).

According to some embodiments, FOE first surface 634a and SOE first surface 694a may each be coated by an anti-reflective coating in order to increase the intensity of the light transmitted into FOE 602 and the light refracted out of SOE 682.

In order not to encumber FIGS. 6A and 6B, light beams reflected off FOE first surface 634a are not shown.

According to some embodiments, controller 608 may be communicatively associated with a computational module 646. Computational module 646 may include one or more processors and volatile and/or non-volatile memory components. The one or more processors may be configured to receive from controller 608 raw or processed sensed data obtained by light sensing component 624, and, based thereon, compute a collective (e.g. average and/or maximum) deviation(s) from parallelism and/or deviations from parallelism between pairs of internal facets 64, essentially as detailed above in the description of system 100. Raw sensed data may include intensities of pixels making up spots formed by exiting light beams focused on the light sensing component 624. Processed sensed data may include the angular deviations between (pairs of) the exiting light beams or the center points of the spots formed by the exiting light beams. According to some such embodiments, computational module 646 may be configured to process raw sensed data, obtained by light sensing component 624, to obtain therefrom the angular deviations between (pairs of) the exiting light beams.

According to some embodiments, the one or more processors may include a graphics processing unit (GPU) configured to execute image recognition software in order to identify spots formed by the exiting light beams on an image sensor included in light sensing component 624. According to some embodiments, computational module 646 may be included in system 600.

From the angular deviations between the exiting light beams, magnitudes of deviations from parallelism between the internal facets may be inferred, essentially as described above in the description of system 100. The angular deviations may be derived from sensed data of the exiting light beams (e.g. from the coordinates of spots formed by the exiting light beams on an image sensor of light sensing component 624) obtained using light sensing component 624, essentially as detailed above in the description of system 100. According to some embodiments, the derivation of the angular deviations may involve use of image recognition software, and, optionally, other software (both of which may be executed by computational module 146) in order to identify the spots formed by the exiting light beams on the image sensor, compute coordinates of the spots (e.g. the center points thereof), and so on, essentially as detailed above in the description of system 100.

By way of a non-limiting example, according to some embodiments, wherein a collimating lens of a focal length $f_1'$ is used to focus the exiting light beams on an image sensor (e.g. of the autocollimator), a maximum radial deviation $\varepsilon'_{max}$ from parallelism between (pairs of) internal facets 64 may be obtained using the relations $$\tan(\delta'_{max}) = \frac{1}{f_1'}\sqrt{\sum_{k=x,y}\left(\max\{|u'_{\beta,k}-u'_{\gamma,k}|, |u'_{\gamma,k}-u'_{\alpha,k}|, |u'_{\alpha,k}-u'_{\beta,k}|\}\right)^2}$$

and $n_s \cdot \sin(2\varepsilon'_{max}) = \sin(\delta'_{max})$.

Here $u'_\alpha = (u'_{\alpha,x}, u'_{\alpha,y})$, $u'_\beta = (u'_{\beta,x}, u'_{\beta,y})$, and $u'_\gamma = (n'_{\gamma,x}; u'_{\gamma,y})$ are two-dimensional vectors specifying coordinates of a first spot, a second spot, and a third spot, respectively, formed by the exiting light beams on the image sensor.

According to some embodiments, an average radial deviation from parallelism s'avg between internal facets 64 may be obtained using the relations $$\tan(\delta'_{\gamma\beta}) = \sqrt{(u'_\beta - u'_\gamma)^2}/f_1', \; \tan(\delta'_{\alpha\gamma}) = \sqrt{(u'_\gamma - u'_\alpha)^2}/f_1', \text{ and}$$

$$\tan(\delta'_{\beta\alpha}) = \sqrt{(u'_\alpha - u'_\beta)^2}/f_1',$$

and $n_s \cdot \sin(2\varepsilon'_{\gamma\beta}) = \sin(S'_{\gamma\beta})$, $n_s \cdot \sin(2\varepsilon'_{\alpha\gamma}) = \sin(\delta'_{\alpha\gamma})$, and $n_s \cdot \sin(2\varepsilon'_{\beta\beta}) = \sin(\delta'_{\beta\beta})$, wherein $\varepsilon'_{avg} = (\varepsilon'_{\gamma\beta} + \varepsilon'_{\alpha\gamma} + \varepsilon'_{\beta\alpha})/3$. Here $\delta'_{\gamma\beta}$ is the magnitude of the angle between the exiting light beams forming the third spot and the second spot. $\varepsilon'_{\alpha\gamma}$ is the magnitude of the angle between the exiting light beams forming the first spot and the third spot. $\varepsilon'_{\beta\alpha}$ is the magnitude of the angle between the exiting light beams forming the second spot and the first spot. $\varepsilon'_{\gamma\beta}$ is the radial deviation between the two internal facets off which the exiting light beams, forming the third spot and the second spot, respectively, are reflected. $\varepsilon'_{\alpha\gamma}$ is the radial deviation between the two internal facets off which the exiting light beams, forming the first spot and the third spot, respectively, are reflected. $\varepsilon'_{\beta\alpha}$ is the radial deviation between the two internal facets off which the exiting light beams, forming the second spot and the first spot, respectively, are reflected. Analogous expressions for average deviations in pitch and in roll between internal facets 64 may be inferred from $u'_\alpha$, $u'_\beta$, and $u'_\gamma$ in the same manner as detailed above (with respect $u_\alpha$, $u_\beta$, and $u_\gamma$) in the description of FIG. 2A.

According to some embodiments, wherein the deviations from parallelism are sufficiently small, small angle approximations may be employed. Under the small angle approximation (when working in radians)

$$\varepsilon'_{\gamma\beta} = \sqrt{(u'_\beta - u'_\gamma)^2}/(2n_s'f_1'), \; \varepsilon'_{\alpha\gamma} = \sqrt{(u'_\gamma - u'_\alpha)^2}/(2n_s'f_1'), \text{ and}$$

$$\varepsilon'_{\beta\alpha} = \sqrt{(u'_\alpha - u'_\beta)^2}/(2n_s'f_1').$$

Similarly, $\varepsilon'_{\gamma\beta,\,p} = |u'_{\beta,\,x} - u'_{\gamma,\,x}|/(2n_s' \cdot f_1')$, $\varepsilon'_{\alpha\gamma,\,p} = |u'_{\gamma,\,x} - u'_{\alpha,\,x}|/(2n_s' \cdot f_1')$, and $\varepsilon B_{\alpha,\,p} = |u'_{\alpha,\,x} - u'_{\beta,\,x}|/(2n_s' \cdot f_1')$, and $\varepsilon'_{\gamma\beta,\,r} = |u'_{\beta,\,y} - u'_{\gamma,\,y}|/(2n_s' \cdot f_1')$, $\varepsilon'_{\alpha\gamma,\,r} = |u'_{\gamma,\,y} - u'_{\alpha,\,y}|/(2n_s' \cdot f_1')$, and $\varepsilon'_{\beta\alpha,\,r} = |u'_{\alpha,\,y} - u'_{\beta,\,y}|/(2n_s' \cdot f_1')$. According to some embodiments, and as depicted in FIGS. 6A and 6B, sample 60 may be sandwiched between FOE 602 and SOE 682 such that FOE second surface 634b and SOE second surface 694b fully contact all of first area 63a and second area 63b, respectively. In such embodiments, the transmitted light beam passes directly from FOE 602 into sample 60, and the reflected light beams pass directly from sample 60 into SOE 682.

According to some embodiments, FOE second surface 634b does not contact sample first surface 66a and SOE second surface 694b does not contact sample second surface 66b. According to some such embodiments, an index matching shape-compliant interface (not shown) may be inserted between FOE 602 and sample 60 and between SOE 682 and sample 60, essentially as described above in the description of system 100. The shape-compliant interface may have about the same (e.g. greater than $n_s'-0.02$ and smaller than $n_s'+0.02$) refractive index as substrate 62.

According to some alternative embodiments, not depicted in the Figures, instead of optical setup 604, system 600 may include an interferometric setup, and information, including radial deviations from parallelism between pairs of internal facets 64, may be extracted from interference patterns formed by the exiting light beams. According to some such embodiments, the interferometric setup may include an array of beam splitters and an associated array of controllably openable and closeable blocking filters configured to allow inspecting pairs of internal facets one at a time. More specifically, the beam splitters and blocking filters arrays may be configured (i) split an incident beam into a selectable pair of incident sub-beams normally incident on FOE 602, and (ii) recombine two exiting sub-beams (i.e. sub-beams exiting SOE 682)—induced by the pair of incident light beams, respectively—into a single combined exiting light beam, which is then sensed by an image sensor. The beam splitters and the blocking filters arrays are configured such that each selectable pair of incident sub-beams will induce reflection off a respective pair of internal facets with a first incident sub-beam probes one of the internal facets and the second incident sub-beam probes another internal facet. For example, a first incident sub-beam will induce reflection off an i-th internal facet (following transmission into FOE 602, passage therethrough, and transmission into sample 60), and a second incident sub-beam will induce reflection off a j-th internal facet (following transmission into FOE 602, passage therethrough, and transmission into sample 60), wherein i and j are controllably selectable. As the skilled person will readily recognize, the radial deviation from parallelism of between the i-th and j-th internal facet may be extracted from the interference pattern formed thereby on the light sensor.

According to some embodiments, each of internal facets 64 may be inspected (probed) one at a time, e.g. using a translatable slitted or apertured optical mask or a shutter assembly. FIG. 7 schematically an optical-based system 700, which corresponds to specific embodiments of system 600, and which is configured for validating parallelism between internal facets of a sample by inspecting the internal facets one at a time. More specifically, FIG. 7 presents a cross-sectional side-view of system 700 and sample 60, according to some embodiments. (It is to be understood that sample 60 does not constitute a part of system 700.)

System 700 includes a light transmissive FOE 702, a light transmissive SOE 782, an optical setup 704, and, optionally, a controller 708, which correspond to specific embodiments of FOE 602, SOE 682, optical setup 604, and controller 608, respectively. FOE 702 includes an FOE first surface 734a and an FOE second surface 734b, which correspond to specific embodiments of FOE first surface 634a and FOE second surface 634b, respectively. SOE 782 includes an SOE first surface 794a and an SOE second surface 794b, which correspond to specific embodiments of SOE first surface 694a and SOE second surface 694b, respectively.

Optical setup 704 includes an ICA 712 and a holding infrastructure 714, which correspond to specific embodiments of ICA 612 and holding infrastructure 614, respectively. ICA 712 includes a light source 722, an image sensor 724, a collimating lens 740, and a focusing lens 750. According to some embodiments, ICA 712 may further include an optical mask 756 including a slit 758. According to some embodiments, optical mask 756 may be translatable, so as to allow controllably positioning slit 758 above any one of internal facets 64, and thereby allow inspecting each of internal facets 64 one at a time. According to some such embodiments, optical setup 704 may further include a motor 760, which may be mechanically associated with optical mask 756, so as to allow translating optical mask 756. According to some embodiments, motor 760 may be a linear stepper motor, which may be mechanically coupled to optical mask 756 via a screw 762.

Also indicated is a platform 738 of holding infrastructure 714. Platform 738 corresponds to specific embodiments of platform 638 of holding infrastructure 614.

Also indicated is a computational module 746, which corresponds to specific embodiments of computational module 646. According to some embodiments, computational module 746 may be included in system 700.

Figure 7:
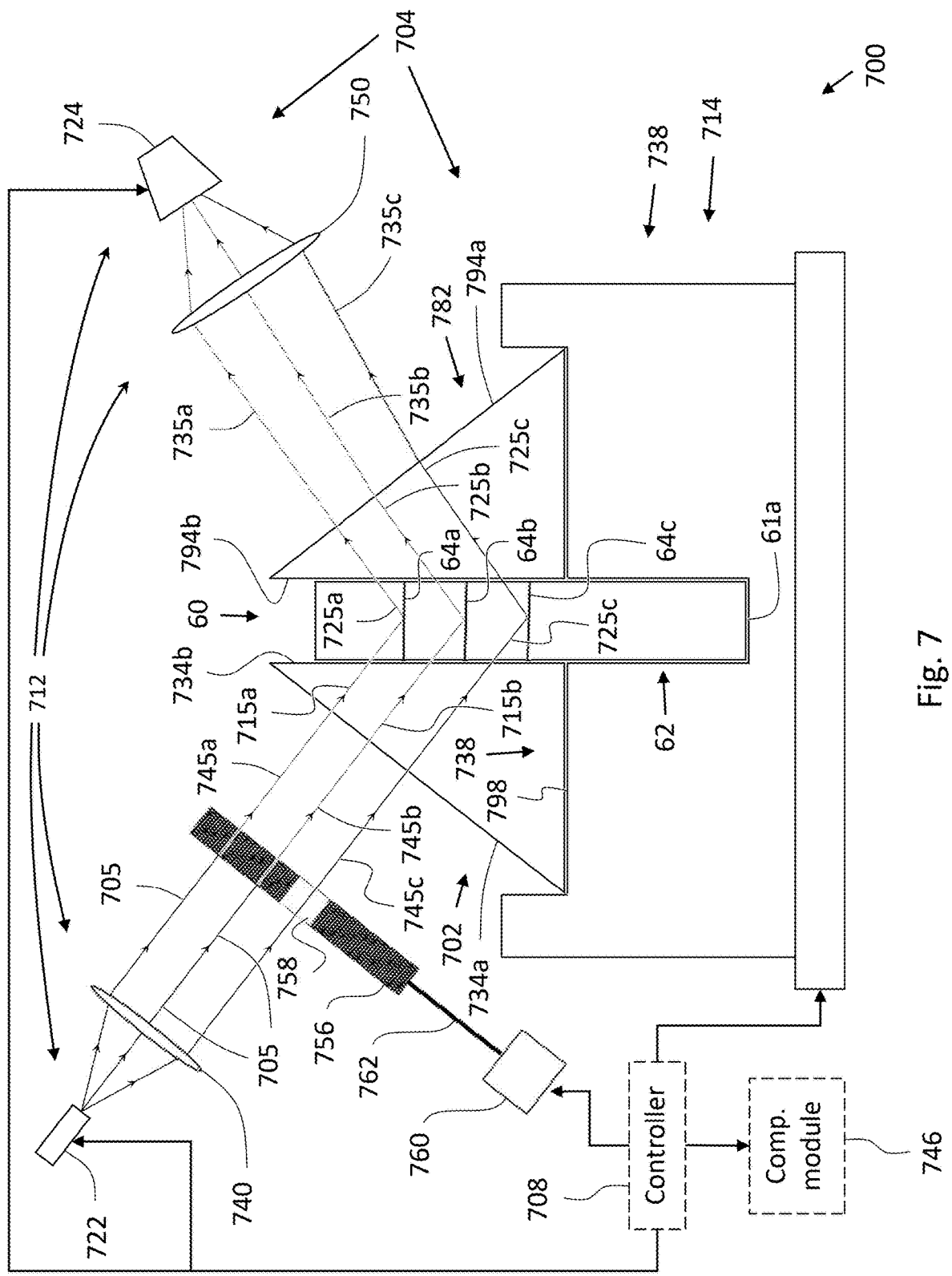
FIG. 7 schematically depicts an optical-based system for metrology of internal facets of samples, which corresponds to specific embodiments of the system of FIG. 6A.

According to some alternative embodiments, not depicted in FIG. 7, instead of optical mask 756 (and motor 760), ICA 712 may include a shutter assembly including a plurality of individually openable and closeable shutters. Each shutter may be positioned over a respective internal facet, thereby allowing to inspect each of internal facets 64 one at a time.

In operation, according to some embodiments, optical mask 756 is translated, so as to position slit 758 over each of internal facets 64 one after the other. For example, and as depicted in FIG. 7, when slit 758 is positioned over first internal facet 64a, a collimated light beam, indicated by arrows 705 (not all of which are numbered), is projected on optical mask 756 in a direction, perpendicular to FOE first surface 734a. (More specifically, light generated by light source 722 may be collimated by collimating lens 740, thereby preparing the collimated light beam.) A (third) incident portion of the collimated light beam passes through slit 758, normally impinges on FOE first surface 734a, and is transmitted therethrough into FOE 702, thereby obtaining a (third) transmitted light beam. The incident portion is indicated by an arrow 745c and the transmitted light beam is indicated by an arrow 715c.

The transmitted light beam travels across FOE 702, crosses (i.e. is transmitted into) into sample 60 via FOE second surface 734b and sample first surface 66a, and propagates towards third internal facet 64c. The transmitted light beam is reflected off third internal facet 64c towards sample second surface 66b, thereby obtaining a (third) reflected light beam. The reflected light beam is indicated by an arrow 725c. The reflected light beam exits sample 60 into SOE 782 via sample second surface 66b and SOE second surface 794b. The light beam travels to SOE first surface 794a and exits (e.g. is refracted out of) SOE 782, thereby obtaining a third exiting light beam. The exiting light beam is indicated by an arrow 735c. The exiting light beam passes through slit 758, is focused by focusing lens 750 on image sensor 724, and is sensed thereby.

A trajectory of a first incident portion, a first transmitted light beam, a first reflected light beam, and a first exiting (e.g. refracted) light beam is indicated by dotted arrows 745a, 715a, 725a, and 735a, respectively. This trajectory will be realized when optical mask 756 is translated such that slit 758 is positioned over first internal facet 64a. Arrows 745a, 715a, 725a, and 735a are rendered by a dotted line to indicate this trajectory is not realized when slit 758 is positioned over third internal facet 64c (i.e. the corresponding light beams are not present when slit 758 is positioned over third internal facet 64c). A trajectory of a second incident portion, a second transmitted light beam, a second reflected light beam, and a second exiting (e.g. refracted) light beam is indicated by dotted arrows 745b, 715b, 725b, and 735b, respectively. This trajectory will be realized when optical mask 756 is translated such that slit 758 is positioned over second internal facet 64b. Arrows 745b, 715b, 725b, and 735b are rendered by a dotted line to indicate this trajectory is not realized when slit 758 is positioned over third internal facet 64c (i.e. the corresponding light beams are not present when slit 758 is positioned over third internal facet 64c).

In order not to encumber FIG. 7, light beams reflected off FOE first surface 734a are not shown. According to some embodiments, optical mask 756 may be translated continuously, essentially as described above with respect to optical mask 356 of system 300. According to some alternative embodiments, optical mask 756 may be shifted between distinct locations in a plurality of locations, essentially as described above with respect to optical mask 356 of system 300.

From the angular deviation between two exiting light beams, a deviation from parallelism between the two internal facets, to which the two light beams may be traced, may be inferred, essentially as detailed above in the description of system 300. The angular deviation may be computed from the sensed data of the two exiting light beams (e.g. from the center points of spots formed by the two exiting light beams on image sensor 724). This is exemplified below by way of a non-limiting example, according to some embodiments, focusing lens 750 of a focal length $f_2'$ is used to focus the exiting light beams on image sensor 724.

The two-dimensional vectors $u_{1'}=(u_{1', x}, u_{1', y})$, $u_{2'}=(u_{2', x}, u_{2', y})$, and $u_{3'}=(u_{3', x}, u_{3', y})$ specify the coordinates (e.g. center points) of a first spot, a second spot, and a third spot, respectively. The first spot is induced by light reflected off the first internal facet 64a, the second spot is induced by light reflected off the second internal facet 64b, and the third spot is induced by light reflected off the third internal facet 64c. With a suitable choice of coordinate system, deviations in pitch $\delta'_{21, p}$ and in roll $\delta'_{21, r}$ of the second returned light beam relative to the first returned light beam may be computed via $\tan(\delta'_{21, p})=(u_{2',x}-u_{1',x})/f_2'$ and $\tan(\delta'_{21, r})=(u_{2',y}-u_{1',y})/f_2'$, respectively. Similarly, deviations in pitch $\delta'_{31, p}$ and in roll $\delta'_{31, r}$ of the third returned light beam relative to the first returned light beam may be computed via $\tan(\delta'_{31, p})=(u_{3, x}-u_{2', x})/f_2'$ and $\tan(\delta'_{31, r})=(u_{3', y}-u_{1', y})/f_2'$, respectively, and deviations in pitch $\delta'_{32, p}$ and in roll $\delta'_{32, r}$ of the third returned beam relative to the second returned beam may be computed via $\tan(\delta'_{32, p})=(u_{3', x}-u_{2', x})/f_2'$ and $\tan(\delta'_{32, r})=(u_{3', x}-u_{2', x})/f_2'$, respectively. Accordingly, the deviations from parallelism in pitch $\varepsilon'_{21, x}$ and in roll $\varepsilon'_{21, y}$ of second internal facet 64b relative to first internal facet 64a may be computed using the relations $n_s' \cdot \sin(2\varepsilon'_{21, p})=\sin(\delta'_{21, p})$ and $n_s' \cdot \sin(2\varepsilon'_{21, r})=\sin(\delta'_{21, r})$, respectively. The deviations from parallelism in pitch $\varepsilon'_{31, p}$ and in roll $\varepsilon'_{31, r}$ of third internal facet 64c relative to first internal facet 64a may be computed using $n_s' \cdot \sin(2\varepsilon'_{31, p})=\sin(\delta'_{31, p})$ and $n_s' \cdot \sin(2\varepsilon'_{31, r})=\sin(\delta'_{31, r})$, respectively. The deviations from parallelism in pitch $\varepsilon'_{32, p}$ and in roll $\varepsilon'_{32, r}$ of third internal facet 64c relative to second internal facet 64b may be computed using $n_s' \cdot \sin(2\varepsilon'_{32, p})=\sin(\delta'_{32, p})$ and $n_s' \cdot \sin(2\varepsilon'_{32, r})=\sin(\delta'_{32, r})$, respectively. According to some embodiments, wherein the deviations from parallelism are sufficiently small, small angle approximations may be employed. As will be apparent to the skilled person, under the small angle approximation (when working in radians) $\varepsilon'_{21, p}=(u_{2', x}-u_{1', x})/(2n_s' \cdot f_2')$ and $\varepsilon'_{21, r}=(u_{2', y}-u_{1', y})/(2n_s' \cdot f_2')$, $\varepsilon'_{31, p}=(u_{3', x}-u_{1', x})/(2n_s' \cdot f_2')$ and $\varepsilon'_{31, r}=(u_{3', y}-u_{1', y})/(2n' \cdot f_2')$, and $\varepsilon'_{32, p}=(u_{3', x}-u_{2', x})/(2_s' \cdot f_2')$ and $\varepsilon_{32, r}=(u_{3', y}-u_{2', y})/(2n_s' \cdot f_2')$.

Methods

Figure 8:
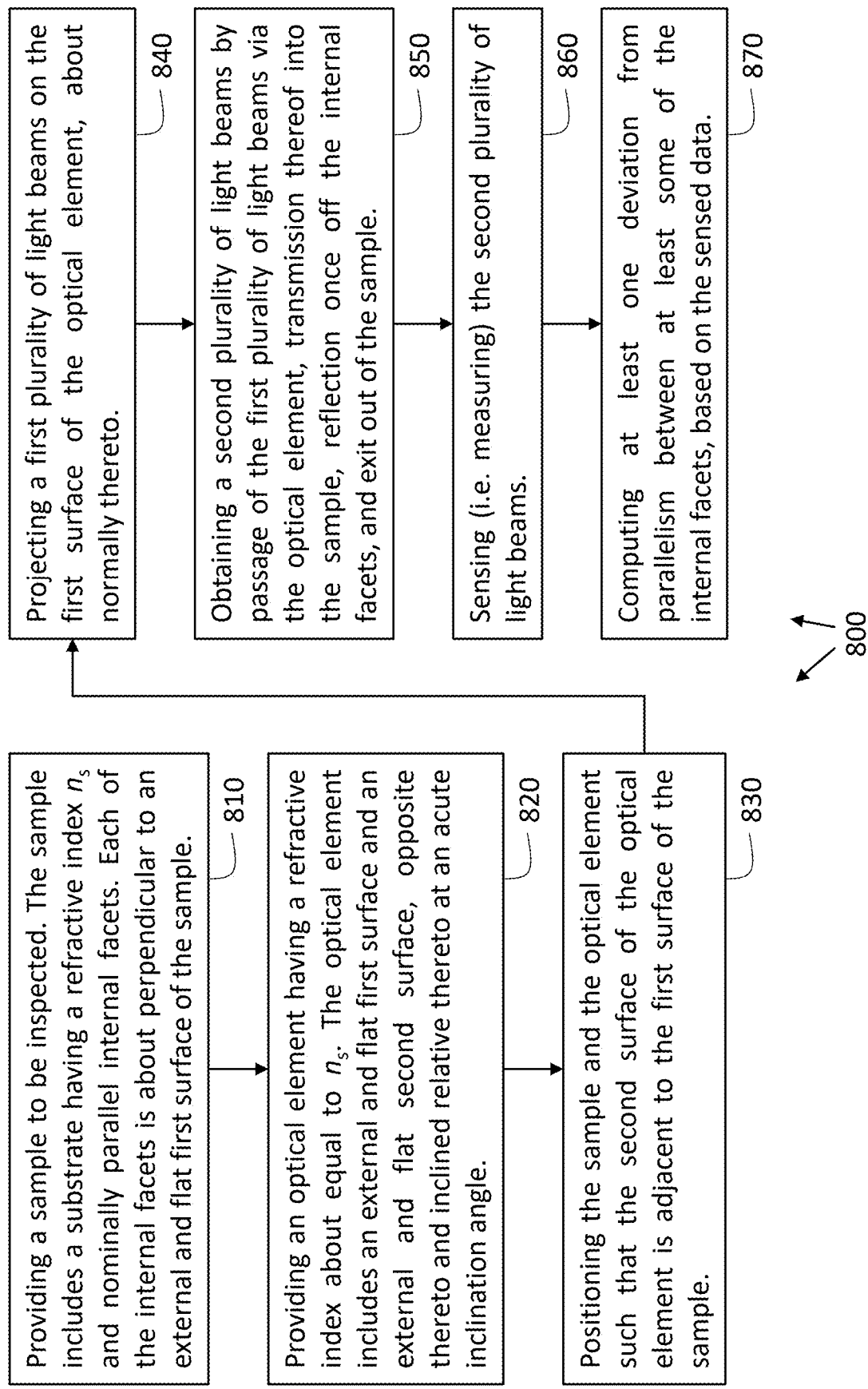
FIG. 8 presents a flowchart of an optical-based method for metrology of internal facets of samples, according to some embodiments.

According to an aspect of some embodiments, there is provided an optical-based method for metrology of internal facets of samples. The method may be employed to validate parallelism between internal facets of a sample. FIG. 8 presents a flowchart of such a method, an optical-based method 800, according to some embodiments. Method 800 may include:

A stage 810, wherein a sample (e.g. sample 10 or 60), which is to be inspected, is provided. The sample includes a light transmissive substrate (e.g. substrate 12 or 62), which has a refractive index Is, and two or more nominally parallel internal facets (e.g. internal facets 14 or 64), which are embedded in the substrate. Each of the internal facets is about perpendicularly oriented relative to an external and flat first surface of the sample.

A stage 820, wherein a (first) optical element (e.g. optical element 102 or 302 or FOE 602 or 702, or similar thereto), which has a refractive index about equal to $n_s$ (e.g. greater than $n_s$−0.02 and smaller than $n_s$+0.02), is provided. The optical element includes an external and flat first surface and an external and flat second surface, which is opposite to the first surface of the optical element and inclined relative thereto at an acute (first) inclination angle.

A stage 830, wherein the sample and the optical element are positioned such that the second surface of the optical element is adjacent to the first surface of the sample.

A stage 840, wherein a first plurality of light beams (also referred to as "incident light beams") is projected on the first surface of the optical element, about normally thereto (e.g. to within 2° from normal incidence).

A stage 850, wherein a second plurality of light beams is obtained as a result of passage of each light beam in the first plurality of light beams through the optical element, transmission thereof into the sample, reflection once off the internal facets, and exit out of (i.e. transmission out of) the sample.

A stage 860, wherein the second plurality of light beams is sensed (measured; e.g. using light sensing component 124).

A stage 870, wherein, based (at least) on the sensed data (obtained in stage 860), at least one deviation from parallelism between at least some of the internal facets is computed.

As used herein, the term "obtaining" may be employed both in an active and a passive sense. Thus, for example, in stage 850 the second plurality of light beams may be obtained, not as a result of any operation implemented in stage 850, but rather due to the generation of the first plurality of light beams in stage 840. Generally, a stage may describe an active operation performed by a user or by the system used to implement the method, and/or the results or effects of one or more operations performed in one or more earlier stages.

Method 800 may be employed to validate parallelism between internal facets of a sample, such as sample 10 or sample 60. In particular, method 800 may be employed to validate parallelism between internal facets of one-dimensional waveguides as well as between internal facets of two-dimensional waveguides.

Method 800 may be implemented employing an optical-based system, such as any one of systems 100, 300, 600, and 700, or a system similar thereto, as detailed above in the respective descriptions thereof.

According to some embodiments, a single optical element, such as optical element 102 or optical element 302, is employed. According to some embodiments, the second plurality of light beams is obtained following repassage of light beams through the optical element, which follows (a first) passage through the optical element and reflection once off the internal facets, as described above in the description of FIGS. 1A-1E and in the description of FIG. 3, and as described below in the description of FIG. 9. According to some embodiments, the optical element may be prism (e.g. a triangular prism).

According to some embodiments, a pair of optical elements may be employed: a first optical element (e.g. FOE 602 or 702) and a second optical element (e.g. SOE 682 or 782). According to some embodiments, the second plurality of light beams is obtained following (single) passage of light beams through the first optical element, transmission into the sample and reflection once off the internal facets, and (single) passage through the second optical element, as described above in the description of FIGS. 6A and 6B and in the description of FIG. 7, and as described below in the description of FIG. 10. According to some embodiments, each of the optical elements may be prism (e.g. a triangular prism).

According to some embodiments, in stage 840, the light beams in the first plurality constitute complementary portions of an expanded light beam, which is collimated. According to some embodiments, the expanded light beam may be monochromatic. According to some such embodiments, the expanded light beam may be a laser beam.

According to some embodiments, the internal facets are successively inspected one after the other. According to some such embodiments, the internal facets may be "continuously" inspected by scanning a light spot on the internal facets one internal facet after another.

According to some embodiments, the internal facets are inspected (probed) one at a time. More specifically, according to some embodiments, stages 840, 850, and 860 may be implemented N times, wherein N is the number of internal facets, and wherein in each implementation light is impinged on only one of the internal facets, essentially as described above in the description of system 100, according to some embodiments thereof, in the description of system 300, or in the description of system 600, according to some embodiments thereof, and in the description of system 700.

According to some embodiments, wherein an image sensor is employed to sense the light beams in the second plurality (e.g. when a camera and/or an autocollimator is used), stage 870 may include an initial substage wherein image recognition software is used to identify spots formed by the light beams in the second plurality on a photosensitive surface of the image sensor (e.g. spots 201, spots 401, spots formed on the image sensor of system 600, or spots formed on image sensor 724). According to some embodiments, the initial substage may further include assigning coordinates to each of the spots, e.g. determining the center points of the spots. According to some embodiments, the center points may be determined by averaging over the coordinates of each point making up a spot weighted by the intensity of the point.

According to some embodiments, wherein the internal facets are inspected one at a time, in stage 870, deviations from parallelism between pairs of adjacent internal facets are computed. Additionally, or alternatively, according to some embodiments, deviations from parallelism between each of the internal facets (except for a reference internal facet) and the reference internal facet (e.g. a side most facet) are computed. According to some embodiments, deviations from parallelism between each pair internal facets are computed. According to some embodiments, based on the computed deviations, one or more of an average and/or a maximum deviation from parallelism are computed. According to some embodiments, average and/or maximum deviations in pitch and/or in roll may be computed.

Figure 9:
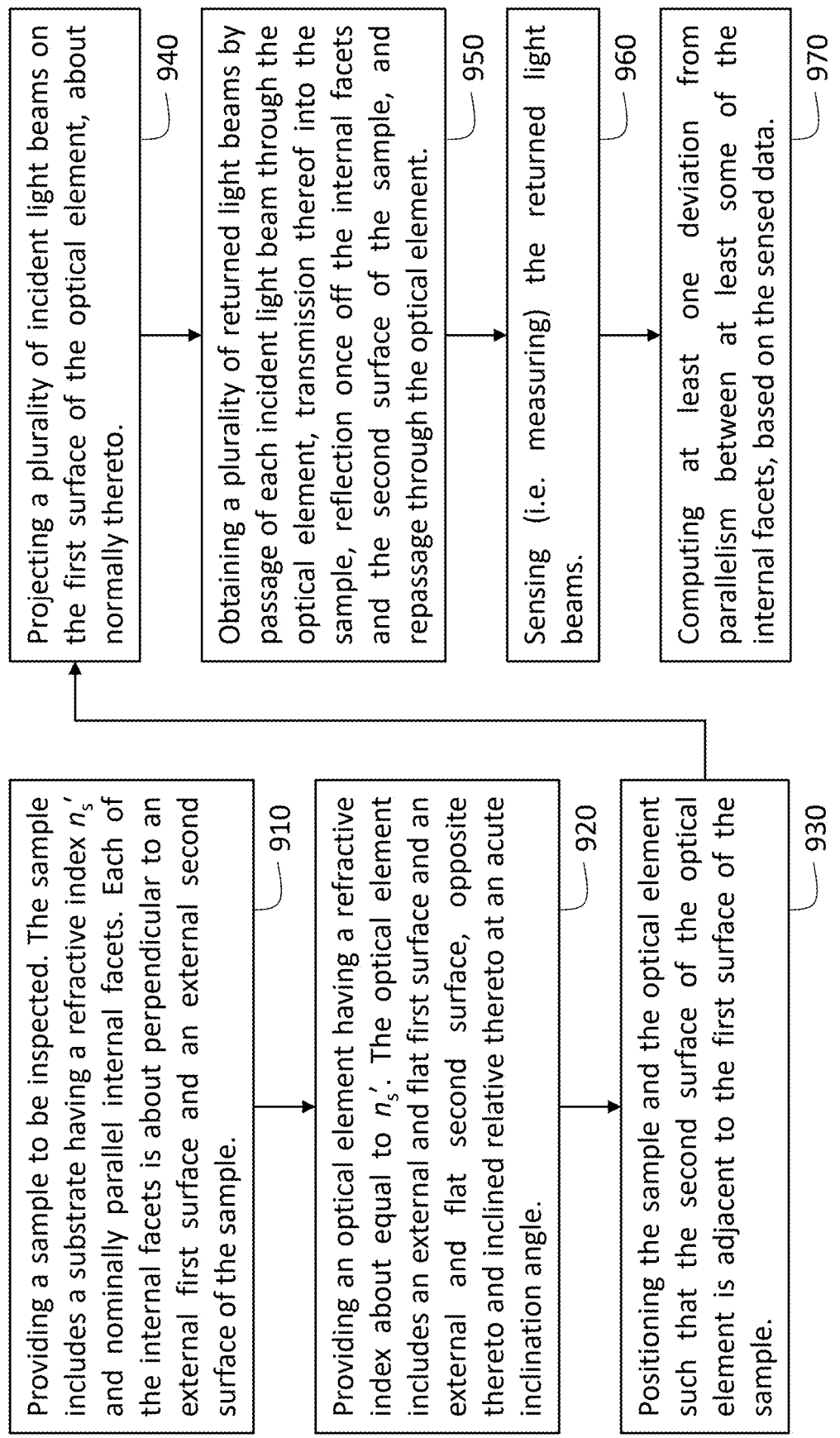
FIG. 9 presents a flowchart of an optical-based method for metrology of internal facets of samples, which corresponds to specific embodiments of the method of FIG. 8.

Ways whereby the various deviations from parallelism (mentioned above) may be computed are detailed below in the descriptions of FIG. 9 and FIG. 10.

According to some embodiments, there is provided an optical-based method for metrology of internal facets of samples. The method may be employed to validate parallelism between internal facets of a sample. FIG. 9 presents a flowchart of such a method, an optical-based method 900, according to some embodiments. Method 900 may include:

- A stage 910, wherein a sample (e.g. sample 10), which is to be inspected, is provided. The sample includes a light transmissive substrate, which has a refractive index Is', and two or more nominally parallel internal facets (e.g. internal facets 14), which are embedded in the substrate. Each of the internal facets is about perpendicularly oriented relative to an external and flat first surface of the sample and an external and flat second surface of the sample.
- A stage 920, wherein an optical element (e.g. optical element 102 or optical element 302), which has a refractive index about equal to $n_s'$ (e.g. greater than $n_s'-0.02$ and smaller than $n_s'+0.02$), is provided. The optical element includes an external and flat first surface and an external and flat second surface, which is opposite to the first surface of the optical element and inclined relative thereto at an acute inclination angle.
- A stage 930, wherein the sample and the optical element are positioned such that the second surface of the optical element is adjacent to the first surface of the sample.
- A stage 940, wherein a first plurality of light beams (also referred to as "incident light beams") is projected on the first surface of the optical element, about normally thereto (e.g. to within 2° from normal incidence).
- A stage 950, wherein a second plurality of light beams (also referred to as "returned light beams") is obtained as a result of passage of each of the incident light beams through the optical element, transmission thereof into the sample, reflection once off the internal facets and the second surface of the sample, and repassage through the optical element.
- A stage 960, wherein the second plurality of light beams is sensed (i.e. measured; e.g. using light sensing component 124).
- A stage 970, wherein, based (at least) on the sensed data (obtained in stage 960), at least one deviation from parallelism between at least some of the internal facets is computed.

Method 900 corresponds to specific embodiments of method 800. Method 900 may be employed to validate parallelism between internal facets of a sample, such as sample 10. Method 900 may be implemented employing an optical-based system, such as any one of systems 100 and 300, or a system similar thereto, as taught above in the descriptions of FIGS. 1A-5.

According to some embodiments, an autocollimator (e.g. autocollimator 352) is employed to implement stages 940, 950, and 960, e.g. essentially as detailed above in the description of system 100, according to some embodiments thereof, and in the description of system 300. According to some embodiments, the autocollimator includes an image sensor, and in stage 960 the light beams in the second plurality are sensed by the image sensor. Alternatively, according to some embodiments, the autocollimator is a visual autocollimator and the returned light beams are sensed using an eyepiece assembly of the autocollimator (by viewing a graduated reticle through the eyepiece).

According to some embodiments, wherein (i) an image sensor is employed to sense the returned light beams, (ii) stage 970 includes an initial substage wherein image recognition software is used to identify spots formed by the returned light beams on a photosensitive surface of the image sensor, and (iii) the first surface of the optical element is not coated by a reflective coating, so that an additional spot (e.g. spot 211) may be formed on the photosensitive surface of the image sensor (i.e. by light reflected directly off the first surface of the optical element), the image recognition software may further be configured to distinguish the additional spot from the spots formed by the returned light beams.

According to some embodiments, wherein each the of returned light beams may be traced back to a respective specific internal facet (e.g. by inspecting the internal facets one at a time), the deviation in pitch $\varepsilon_{ij,\,p}$ between an i-th internal facet and j-th internal facet may be computed using the relations $\tan(\delta_{ij,\,p})=(x_i-x_j)/f_1$ and $n_s\cdot\sin(2\varepsilon_{ij,p})=\sin(\delta_{ij,p})$. Similarly, the deviation in roll $\varepsilon_{ij,\,y}$ between the i-th internal facet and the j-th internal facet may be computed using the relations $\tan(\delta_{ij,\,r})=(y_i-y_j)/f_1$ and $n_s\cdot\sin(2\varepsilon_{ij,r})=\sin(\delta_{ij,\,r})$. $f_1$ is a focal length of a focusing lens or a focusing lens assembly used to focus the returned light beams on a light sensing component employed to sense the returned light beams. $x_i$ and $x_j$ are determined x coordinates of the i-th returned light beam and the j-th returned light beam, respectively (e.g. the horizontal coordinates of the center points of the spots formed thereby on an image sensor). $y_i$ and $y_j$ are determined y coordinates of the i-th returned light beam and the j-th returned light beam, respectively (e.g. the vertical coordinates of the center points of the spots formed thereby on the image sensor). (With a suitable choice of coordinate system the tilts in pitch and the tilts in roll are decoupled so that the pitch affects only the values of the x coordinates of the spots and the roll affects only the values of the y coordinates of the spots.)

The radial deviation from parallelism &, of the i-th internal facet relative to the j-th internal facet can be computed using the relations $$\tan(\delta_{ij})=\sqrt{(x_i-x_j)^2+(y_i-y_j)^2}/f_1$$

and $n_s\cdot\sin(2\varepsilon_{ij})=\sin(\varepsilon_{ij})$, According to some embodiments, wherein the deviations from parallelism are sufficiently small, small angle approximations may be employed. As will be apparent to the skilled person, under the small angle approximation (when working in radians) $\varepsilon_{ij,\,p}=(x_i-x_j)/(2n_s\cdot f_i)$ and $\varepsilon_{ij,r}=(y_i-y_j)/(2n_s\cdot f_1)$.

According to some embodiments, the determination of the coordinates of the spots may be include computing associated uncertainties, and, based thereon, uncertainties in the deviations from parallelism between pairs of internal facets.

According to some embodiments, wherein the internal facets are not inspected one at a time (e.g. all the internal facets are simultaneously inspected), so that determined coordinates (e.g. the center points of spots formed thereby on an image sensor) of a returned light beam are typically not attributable to one of the internal facets (at least not without additional data), in stage 970, an average radial deviation (i.e. average magnitude of deviation) from parallelism and/or a maximum radial deviation (i.e. magnitude of deviation) from parallelism are computed. According to some embodiments, angular deviations between pairs of the returned light beams may first be computed. More specifically, an average radial deviation from parallelism may be obtained by using the relations $$\tan(\delta'_{lm})=\sqrt{(x_l-x_m)^2+(y_l-y_m)^2}/f_1$$

and $n_s\cdot\sin(2\varepsilon'_{ij})=\sin(\delta'_{ij})$ to compute $$\frac{1}{M'}\sum_{l,m>l}\varepsilon'_{lm}.$$

Here $\delta'_{lm}$ is the magnitude of the angular deviation between the light beam inducing the I-th spot and the light beam inducing the m-th spot. $\varepsilon'_{lm}$ is the magnitude of the deviation (i.e. the radial deviation) between the internal facet, off which the light beam inducing the I-th spot is reflected, and the internal facet off which the light beam inducing the m-th spot is reflected. M is the number of (different) internal facet pairs. A maximum radial deviation from parallelism may be obtained by computing $\max\{\varepsilon_{lm}\}_{l,\,m>l}$.

According to some embodiments, to eliminate having to distinguish between the returned light beams and light reflected directly off the first surface of the optical element, the first surface of the optical element may be coated by an anti-reflective coating. Additionally, or alternatively, according to some embodiments, the incident light beam may be slightly tilted by an angle $\Delta'$ relative to the normal to the first surface of the optical element. $|\Delta'|$ is selected sufficiently large to ensure that the returned light beams are distinguishable from light reflected directly off the first surface of the optical element, as explained above in the description of system 100. According to some embodiments, $0.3°\leq|\Delta'|\leq0.5°$, $0.2°\leq|\Delta'|\leq0.7°$, or even $0.1°\leq|\Delta'|\leq1°$. Each possibility corresponds to different embodiments.

According to some embodiments, particularly embodiments wherein the first surface of the sample and/or the first surface of the optical element are not sufficiently polished and/or cannot be aligned to sufficient precision, in order to eliminate or at least mitigate dispersion, a shape compliant interface, which has about the same refractive index (e.g. greater than $n_s'-0.02$ and smaller than $n_s'+0.02$) as the substrate (of the sample), may be positioned between the optical element and the sample, as detailed above in the description of system 100.

According to some embodiments, there is provided an optical-based method for metrology of internal facets of samples. The method may be employed to validate parallelism between internal facets of a sample. FIG. 10 presents a flowchart of such a method, an optical-based method 1000, according to some embodiments. Method 1000 may include:

- A stage 1010, wherein a sample (e.g. sample 60), which is to be inspected, is provided. The sample includes a light transmissive substrate, which has a refractive index $n_s''$, and two or more nominally parallel internal facets (e.g. internal facets 64), which are embedded in the substrate. Each of the internal facets is about perpendicularly oriented relative to an external and flat first surface of the sample and an external and flat second surface of the sample.
- A stage 1020, wherein a first optical element (FOE; e.g. FOE 602 or FOE 702) and a second optical element (SOE; e.g. SOE 682 or SOE 782) are provided. Each of the FOE and the SOE has a respective refractive index about equal (e.g. greater than $n_s''-0.02$ and smaller than $n_s''+0.02$) to $n_s''$. The FOE includes an external and flat first surface and an external and flat second surface, which is opposite to the first surface of the FOE and inclined relative thereto at an acute inclination angle. The SOE includes an external and flat first surface and an external and flat second surface, which is opposite to the first surface of the SOE and inclined relative thereto at about the inclination angle (of the second surface of the FOE relative to the first surface of the FOE).
- A stage 1030, wherein the sample, the FOE, and the SOE are positioned such that the sample is disposed between the FOE and the SOE with the second surface of the FOE and the second surface of the SOE being adjacent to the first surface of the sample and the second surface of the sample, respectively.
- A stage 1040, wherein a plurality of incident light beams is projected on the first surface of the FOE, about normally thereto (e.g. to within 1°, 1.5°, or even 2° from normal incidence).
- A stage 1050, wherein a second plurality of light beams (also referred to "exiting light beams") is obtained by passage of the incident light beams through the FOE, transmission thereof into the sample, reflection once off the internal facets, transmission into SOE, and exit out of (e.g. refraction out of) the SOE.
- A stage 1060, wherein second plurality of light beams is sensed (i.e. measured; e.g. using light sensing component 624 or image sensor 724).
- A stage 1070, wherein, based on the sensed data, at least one deviation from parallelism between at least some of the internal facets is computed.

Method 1000 corresponds to specific embodiments of method 800. Method 1000 may be employed to validate parallelism between internal facets of a sample, such as sample 60. Method 1000 may be implemented employing an optical-based system, such as any one of systems 600 and 700, or a system similar thereto, as taught above in the descriptions of FIGS. 6A-7.

According to some embodiments, wherein each the of the light beams exiting the SOE may be traced back to a specific internal facet in the sample (e.g. by inspecting the internal facets one at a time), the deviation in pitch $\varepsilon''_{ij, p}$ between an i-th internal facet and j-th internal facet may be computed using the relations $\tan(\varepsilon''_{ij, p})=(x'_i-x'_j)/f_2$ and $n_s''\cdot\sin(2\varepsilon''_{ij, p})=\sin(\delta''_{ij, p})$. Similarly, the deviation in roll $\varepsilon''_{ij, r}$ between the i-th internal facet and the j-th internal facet may be computed using the relations $\tan(\delta''_{ij, r})=(y'_i-y'_j)/f_1$ and $n_s''\cdot\sin(2\varepsilon''_{ij, r})=\sin(\delta''_{ij, r})$. $f_2$ is a focal length of a focusing lens or a focusing lens assembly used to focus the exiting light beams on a light sensing component employed to sense the exiting light beams. $x'_i$ and $x'_j$ are determined x coordinates of the i-th exiting light beam and the j-th exiting light beam, respectively (e.g. the horizontal coordinates of the spots formed thereby on an image sensor). $y'_i$ and $y'_j$ are determined y coordinates of the i-th exiting light beam and the j-th exiting light beam, respectively (e.g. the vertical coordinates of the spots formed thereby on an image sensor). (Here it is implicitly assumed that coordinate system is such that tilts in pitch and tilts in roll are decoupled, as explained above in the description of method 900.)

According to some embodiments, the determination of the coordinates of the spots may be include computing associated uncertainties, and, based thereon, uncertainties in the deviations from parallelism between pairs of internal facets.

According to some embodiments, wherein the internal facets are not inspected one at a time, so that determined coordinates (e.g. the center points of spots formed thereby on an image sensor) of an exiting light beam are typically not attributable to one of the internal facets, in stage 1070, an average radial deviation from parallelism and/or a maximum radial deviation from parallelism are computed. According to some embodiments, angular deviations between pairs of the exiting light beams may first be computed. More specifically, average radial deviation from parallelism may be obtained by using the relations $$\tan(\delta'''_{lm}) = \sqrt{(x'_l - x'_m)^2 + (y'_l - y'_l)^2}/f_2$$

and $n_s''\cdot\sin(2\varepsilon'''_{ij})=\sin(\delta'''_{ij})$ to compute $$\frac{1}{M'}\sum_{l,m>l}\varepsilon'''_{lm}.$$

Here $\delta'''_{lm}$ is the magnitude of the angular deviation between the light beam inducing the l-th spot and the light beam inducing the m-th spot. $\varepsilon'''_{lm}$ is the magnitude of the deviation (i.e. the radial deviation) between the internal facet, off which the light beam inducing the l-th spot is reflected, and the internal facet off which the light beam inducing the m-th spot is reflected. M' is the number of (different) internal facet pairs. A maximum radial deviation from parallelism may be obtained by computing $\max\{\varepsilon'''_{lm}\}_{l, m>1}$.

According to some embodiments, particularly embodiments wherein the first and second surfaces of the sample and/or the second surface of the FOE and the second surface of the SOE are not sufficiently polished and/or cannot be aligned to sufficient precision, in order to eliminate or at least mitigate dispersion, shape compliant interfaces, which have about the same (e.g. greater than $n_s''-0.02$ and smaller than $n_s''+0.02$) refractive index as the substrate (of the sample), may be positioned between the FOE and the sample and the SOE and the sample, as detailed above in the description of system 600.

As used herein, the terms "measuring" and "sensing" are used interchangeably. Similarly, the terms "sensed data" and "measurement data" (or "measured data") are used interchangeably.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although stages of methods according to some embodiments may be described in a specific sequence, methods of the disclosure may include some or all of the described stages carried out and/or occurring in a different order. A method of the disclosure may include a few of the stages described or all of the stages described. No particular stage in a disclosed method is to be considered an essential stage of that method, unless explicitly specified as such.

Although the disclosure is described in conjunction with specific embodiments thereof, it is evident that numerous alternatives, modifications, and variations that are apparent to those skilled in the art may exist. Accordingly, the disclosure embraces all such alternatives, modifications, and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. An optical-based system for metrology of a sample, having a substrate with a refractive index Is and two or more internal facets, which are embedded in the substrate, nominally parallel, and about perpendicular relative to an external and flat first surface of the sample, the system comprising a first optical element (FOE) and an optical setup comprising a light source, optical equipment, and a light sensing component;

wherein the FOE has a refractive index about equal to $n_s$ and comprises an external and flat first surface and an external and flat second surface, which is opposite to the first surface of the FOE and inclined relative thereto at an acute first inclination angle;

wherein the optical setup is configured to enable positioning the sample and/or the FOE, such that the second surface of the FOE is adjacent to the first surface of the sample, and, when so positioned, and a first plurality of light beams, generatable by the light source, will impinge on the first surface of the FOE about normally thereto;

wherein the FOE is further configured to focus on the light sensing component a second plurality of light beams exiting the sample following passage of the light beams in the first plurality via the FOE, transmission thereof into the sample, and reflection once off the internal facets, thereby enabling measurement of angular deviations between light beams in the second plurality; and wherein the angular deviations between the light beams in the second plurality are indicative of deviation from parallelism between the internal facets.

2. The system of claim 1, wherein the optical setup is configured to enable positioning the sample and the FOE such that a first area on the first surface of the sample is fully contacted by the second surface of the FOE, the first area is defined by a section of the sample comprising the internal facets.

3. The system of claim 1, wherein the sample is a one-dimensional reflective waveguide or a two-dimensional reflective waveguide.

4. The system of claim 1, wherein the FOE is a prism.

5. The system of claim 1, wherein the optical setup further comprises a translatable slitted or apertured optical mask, and/or a plurality of shutters, configured to enable inspecting the internal facets one at a time.

6. The system of claim 1, wherein the optical setup is configured to enable positioning the sample and/or the FOE such that a first area on the first surface of the sample is fully contacted by the second surface of the FOE, the first area being defined by a section of the sample comprising the internal facets.

7. The system of claim 1, wherein the first surface of the FOE is coated by an anti-reflective coating.

8. The system of claim 1, wherein the optical setup comprises an autocollimator configured to generate the first plurality of light beams and focus the light beams in the second plurality on the light sensing component.

9. The system of claim 1, wherein the sample comprises an external and flat second surface, which is opposite to the first surface of the sample, and wherein, prior to exiting the sample via the first surface of the sample, the returned light beams are reflected off the second surface of the sample.

10. The system of claim 1, wherein the optical equipment comprises a collimating lens, or a collimating lens assembly, configured to collimate light beams generated by the light source, thereby preparing the first plurality of light beams; and/or wherein the optical equipment comprises a focusing lens, or a focusing lens assembly, configured to focus on the light sensing component the light beams in the second plurality.

11. The system of claim 10, wherein the light source is a laser source.

12. The system of claim 1, wherein the light sensing component comprises an image sensor configured to sense the second plurality of light beams; and/or wherein the light sensing component comprises an eyepiece assembly.

13. The system of claim 12, wherein the sensed data comprises measured intensities of pixels making up spots, induced by the light beams in the second plurality, respectively, on the image sensor.

14. The system of claim 13, further comprising a computational module configured to compute the deviation from parallelism between the internal facets based on the sensed data.

15. The system of claim 14, wherein, as part of the computing of the deviation from parallelism, the computational module is configured to compute the angular deviations between the light beams in the second plurality based on the sensed data.

16. The system of claim 14, wherein the computational module is configured to compute quantities $\varepsilon_{avg}$ and/or $\varepsilon_{max}$; wherein $\varepsilon_{avg}$ is equal to $1/M\Sigma_{i,\ j>i}\varepsilon_{ij}$, and $\varepsilon_{max}$ is equal to $\max\{\varepsilon_{ij}\}_{i,j>i}$, or $$\sqrt{(\max\{x_i\}_i - \min\{x_i\}_i)^2 + (\max\{y_i\}_i - \min\{y_i\}_i)^2}/(2n_s \cdot f)$$

with $$\varepsilon_{ij} = \sqrt{(x_i - x_j)^2 + (y_i - y_j)^2}/(2n_s \cdot f), \{(x_k, y_k)\}_{k=1}^{N}$$

being a set of two-dimensional vectors specifying locations of an i-th and j-th spot on the image sensor, N is a number of the internal facets, M=N·(N−1)/2, and f is a focal length of a focusing lens or a focusing lens assembly configured to focus the returned light beams on the image sensor.

17. The system of claim 14, wherein the optical setup further comprises a translatable slitted or apertured optical mask, and/or a plurality of shutters, configured to enable inspecting the internal facets one at a time, and wherein the computational module is configured to compute deviations from parallelism between pairs of internal facets from the two or more internal facets.

18. The system of claim 17, wherein the computing of the deviations from parallelism between the pairs of internal facets comprises computing deviations in pitch $\{\varepsilon_{ij,p}\}_{i,j}$ and/or in roll $\{\varepsilon_{ij,r}\}_{i,j}$ between the internal facets in in each of the pairs of internal facets, wherein the indices i and j range over distinct internal facet pairs, and $\varepsilon_{ij,p}$ and $\varepsilon_{ij,r}$ are deviations in pitch and in roll, respectively, between an i-th and a j-th of the internal facets.

19. The system claim 1, wherein the sample comprises an external and flat second surface, which is opposite to the first surface of the sample, and wherein the second plurality of light beams comprises light beams exiting the sample via the second surface of the sample.

20. The system of claim 19, further comprising a second optical element (SOE) having a refractive index about equal to $n_s$ and comprising an external and flat first surface and an external and flat second surface, which is opposite to the first surface of the SOE and inclined relative thereto at an acute second inclination angle; and wherein the optical setup is additionally configured to enable positioning the sample and/or the SOE, such that the second surface of the SOE is adjacent to the second surface of the sample.

21. The system of claim 20, wherein the second plurality of light beams comprises light beams, which, following exit thereof out of the sample, via the second surface of the sample, and transmission into the SOE, exit the SOE via the first surface of the SOE.

22. The system of claim 21, wherein the optical setup is further configured to enable positioning the sample and/or the SOE such that a first area on the first surface of the sample is fully contacted by the second surface of the FOE, and a second area of the sample, which is opposite to the first area, is fully contacted by the second surface of the SOE, the first area and second area being defined by a section of the sample comprising the internal facets.

23. The system of claim 22, wherein the internal facets of the sample are perpendicular to the first surface of the sample, and the second surface of the sample is parallel to the first surface of the sample.

24. The system of claim 23, wherein the second inclination angle is about equal to the first inclination angle so that each of the second plurality of light beams exits the SOE about normally to the first surface of the SOE.

25. The system of claim 24, wherein adjacent internal facets of the sample are spaced apart at regular intervals, and each of the first inclination angle and the second inclination angle is equal to about (90°−arctan($d_1/d_2$)), wherein $d_1$ is a distance between the first surface of the sample and the second surface of the sample, and $d_2$ is a distance between adjacent internal facets of the sample.

26. The system of claim 20, wherein the SOE is a prism.

27. The system of claim 20, wherein the first surface of the FOE and the first surface of the SOE are coated by an anti-reflective coating.

* * * * *